United States Patent [19]

Darcy et al.

[11] Patent Number: 4,968,369
[45] Date of Patent: Nov. 6, 1990

[54] BELT FABRICATION MACHINE

[75] Inventors: John J. Darcy, Webster; Edouard E. Langlois, Rochester, both of N.Y.

[73] Assignee: Xerox Corporation, Stamford, Conn.

[21] Appl. No.: 252,957

[22] Filed: Oct. 3, 1988

[51] Int. Cl.$^5$ ............................................ B32B 31/18
[52] U.S. Cl. ............................... 156/217; 156/73.1; 156/256; 156/268; 156/443; 156/510; 156/538; 156/580.1; 226/93; 226/95
[58] Field of Search ............... 156/73.1, 73.4, 157, 156/137, 217, 218, 256, 538, 544, 543, 576, 459, 460, 466, 492, 580.1, 250, 510, 443, 268; 226/93, 95

[56] References Cited

U.S. PATENT DOCUMENTS

| | | | |
|---|---|---|---|
| 3,085,713 | 7/1959 | Reiners | 221/171 |
| 3,375,777 | 6/1965 | Techtmann et al. | 100/93 |
| 3,419,447 | 3/1965 | Hewitt | 156/73 |
| 3,459,610 | 8/1966 | Dijkers et al. | 156/73 |
| 3,673,024 | 3/1969 | Eriksson | 156/137 |
| 3,754,425 | 8/1973 | Bendernaget et al. | 72/234 |
| 3,764,425 | 1/1972 | Neff et al. | 156/69 |
| 3,791,897 | 2/1974 | Mesly | 156/137 |
| 3,867,229 | 2/1975 | Marra | 156/417 |
| 3,879,256 | 4/1975 | Rust, Jr. | 156/580 |
| 3,939,033 | 2/1976 | Grgach et al. | 156/515 |
| 3,947,307 | 3/1976 | Buchacherdt | 156/73.1 |
| 3,994,767 | 11/1976 | Smith | 156/404 |
| 4,033,768 | 7/1977 | Wielach | 96/1.5 |
| 4,042,655 | 8/1977 | Platt et al. | 264/25 |
| 4,078,961 | 3/1978 | Aoki et al. | 156/360 |
| 4,100,005 | 7/1978 | McNeal | 156/73.1 |
| 4,105,486 | 8/1978 | Cantarutti | 156/405 R |
| 4,173,314 | 11/1979 | Curran et al. | 242/58.4 |
| 4,220,491 | 9/1980 | Metcalf et al. | 156/285 |
| 4,222,811 | 9/1980 | Enders | 156/406 |
| 4,285,750 | 8/1981 | DeMartino | 156/218 |
| 4,310,369 | 1/1982 | Miller et al. | 156/218 |
| 4,343,667 | 8/1982 | Hollis | 156/157 |
| 4,357,186 | 11/1982 | Calvert | 156/73.1 |
| 4,359,675 | 11/1982 | Miller, III | 318/603 |
| 4,388,144 | 6/1983 | Wemhöner | 156/538 |
| 4,411,721 | 10/1983 | Wishart | 156/73.1 |
| 4,434,019 | 2/1984 | Hollaway, Jr. | 156/137 |
| 4,465,531 | 8/1984 | Araki et al. | 156/217 |
| 4,465,536 | 8/1984 | Makino et al. | 156/133 |
| 4,519,857 | 5/1985 | Clay | 156/64 |
| 4,532,166 | 7/1985 | Thomsen et al. | 428/57 |
| 4,683,017 | 7/1987 | Figiel et al. | 156/73.1 |
| 4,795,522 | 1/1989 | Orendorf et al. | 226/95 |

FOREIGN PATENT DOCUMENTS 1184193 3/1967 United Kingdom .

Primary Examiner—Caleb Weston

[57] ABSTRACT

An apparatus and process for fabricating belts wherein the leading edge of a web is conveyed from a supply roll in a straight path a predetermined first distance from a web receiving platform having a cutting edge, the web is cut at the cutting edge to form a web segment having the leading edge at one end and a trailing edge at the opposite end, the leading edge is conveyed a predetermined second distance in a downstream direction to form slack in the web, the lower surface of the web adjacent the trailing edge is inverted, the lower surface of the web adjacent the leading edge is inverted, the leading edge and the trailing edge are overlapped to form a lap joint on the upper surface of an elongated anvil having a centerline positioned substantially perpendicular to the straight path of the web to form a loop of the web segment loosely suspended from the joint formed by the overlapped leading edge and trailing edge, the loop of the web segment on the anvil is conveyed along either an arcuate path to position the joint substantially parallel to the direction of the straight path or conveyed vertically while maintaining the centerline of the anvil positioned substantially perpendicular to the straight path of the web, the lap joint is welded on the anvil to form a belt welded at the joint, the loop of the web segment on the anvil is conveyed in a direction opposite the previous direction until it has returned to its previous position, and the belt is removed from the anvil.

23 Claims, 21 Drawing Sheets

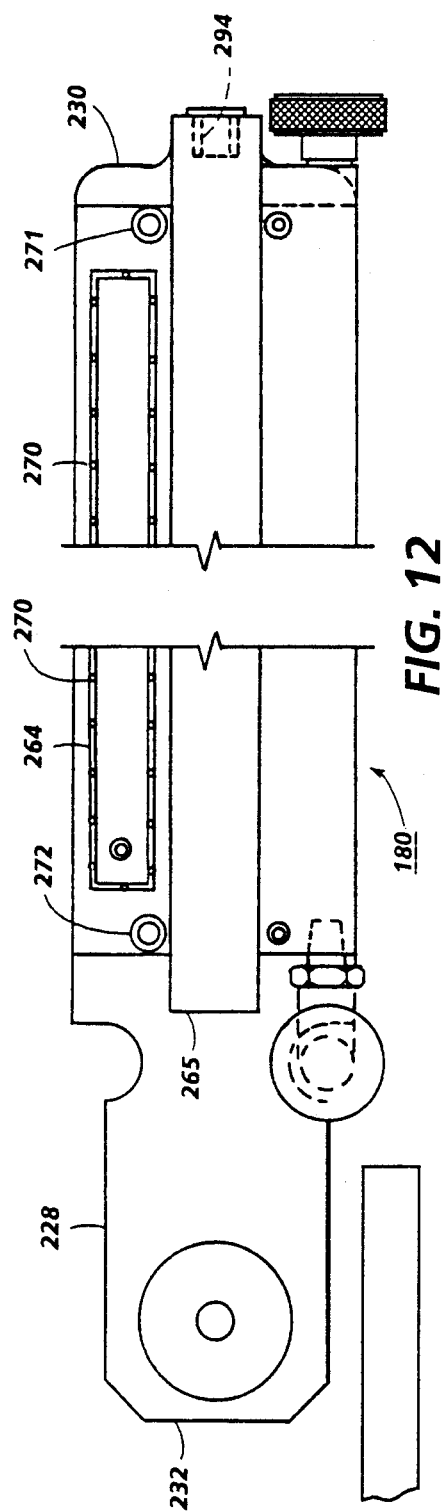
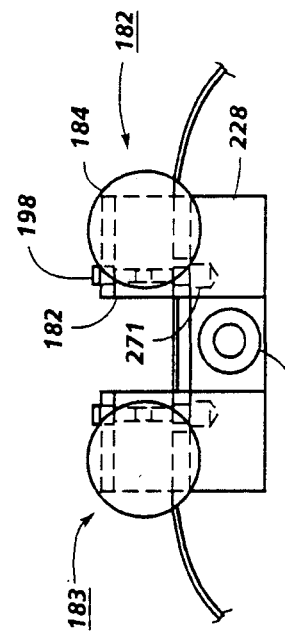
FIG. 12
FIG. 13

BELT FABRICATION MACHINE

BACKGROUND OF THE INVENTION

This invention relates in general to apparatus for fabricating thin flexible belts.

Various techniques have been devised to form belts from webs. Thermoplastic webs may be joined by overlapping the edge of one web over another and placing the overlapped or seam portion of the webs over a base beneath a vibrating welding element. The vibrating welding element may be a horn vibrating at an ultrasonic frequency while it is brought into forced contact with one side of the overlapped webs while the other side of the overlapped web seam is supported on an anvil surface. Transfer of vibratory energy from the horn to the webs material is effected upon impact of a suitably shaped surface of the horn on the seam of the web material. The vibrating energy causes surface heat to be generated between the overlapping webs along the area of contiguous contact between the webs. The horn normally resonates toward and away from the seam at a frequently of about 16 kHz of higher. The weld may be in the form of a chain of spots along the seam or a continuous weld. The technique of ultrasonic weldinng of thermoplastic material is well known and illustrated, for example, in U.S. Pat. Nos. 4,532,166, 3,879,256, 3,939,033, 3,947,307 and U.S. Pat. No. 3,459,610, all incorporated by reference herein in their entirety.

Unfortunately, processes for cutting and welding webs into belts require considerable time, duplicate manual handling, occupy excessive floor space and also require extensive equipment for alignment, cutting, welding, trimming and other processing steps.

Further, excessive manual handling increases the likelihood of damage to sensitive substrates or coatings, particularly for coated substrates that must meet precise tolerance requirements such as flexible electrostatographic imaging member including photoreceptors for high speed electrostatographic copiers, duplicators, printers and the like. Scratches and even fingerprints on the vulnerable surfaces of a sensitive, flexible photoreceptor renders the photoreceptor unacceptable for most electrostatographic copiers, duplicators and printers.

In copending U.S. patent application Ser. No. 845,205 filed May 27, 1986 in the name of E. Swain et al, now abandoned and replaced by copending continuation application Ser. No. 07/374,598, filed Jun. 30, 1989, a process and apparatus are disclosed for fabricating belts in which a first cylindrical mandrel is conveyed to a wrapping station where the leading edge of a web from a web supply roll is supplied to the first cylindrical mandrel at the wrapping station. The leading edge on the first cylindrical mandrel is secured by means of a partial vacuum and the web is wrapped around the first cylindrical mandrel by rotating the first cylindrical mandrel for about one revolution. The web is then severed at the wrapping station to form a trailing edge which overlaps the leading edge of the web to form a first belt having a seam. The first mandrel is conveyed to a welding station and a second mandrel is substantially simultaneously conveyed to the wrapping station. The second mandrel is wrapped with fresh web material from the web supply roll and the seam on the first belt on the first mandrel is substantially simulataneously welded to form a unitary belt. These welded belts may be automatically removed from the mandrels at a belt discharge station. Although this approach produces excellent welded belts, the cylindrical mandrels are complex, heavy, and time consuming and expensive to fabricate. Due to the size and weight, considerable system down time is experienced while changing the three mandrels when a belt having a different circumference and/or width is to be fabricated. Moreover, the web pick up means is cumbersome, heavy, and expensive to fabricate. In addition, the seam of welded electrophotographic imaging members can only be prepared with the leading edge of the web underlying the trailing edge. The lap joint of a welded photoreceptor is normally conveyed in a direction which allows cleaning devices such as cleaning blades to ride smoothly over the lap joint much like rain is allowed to flow downwardly over lapped shingles in a roof. Electrically conductive ground strips are normally provided on only one edge of a photoreceptor. Some electrostatographic copiers, duplicators and printers requires the ground strip to be along one edge whereas other electrostatographic imaging devices require the ground strip to be along the opposite edge. The use of cylindrical mandrel device in the above described copending patent application is also less versatile in providing welded photoreceptor belts for different electrostatographic copiers, duplicators and printers because, relative to the location of a ground strip, some imaging devices require lap joint having the leading edge of the web over the trailing edge whereas other imaging devices require lap joints having the trailing edge of the web over the leading edge. The disclosure of copending U.S. patent application Ser. No. 845,205 filed May 27, 1986 is incorporated in its entirety.

In copending U.S. continuation patent application Ser. No. 231,629, filed Aug. 8, 1988, in the names of K. Thomsen et al, now U.S. Pat. No. 4,838,964 a process and apparatus are discosed for fabricating belts in which the leading edge of a web is conveyed from a supply roll into a belt loop forming station, the web is cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted trailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint. This welded bekt may be automatically removed from the anvil at a belt discharge station. The disclosure of copending U.S. continuation patent application Ser. No. 213,629, filed Aug. 8, 1988, in the names of K. Thomsen et al is incorporated herein in its entirety.

PRIOR ART STATEMENT

U.S. Pat. No. 4,357,186 to Calvert, issued Nov. 2, 1982—An apparatus is diclosed for forming carrying straps from a predetermined length of plastic strip. The device forms a loop from the strip by gripping the leading edge with a pair of jaws and rotating the jaws 360° with measured feeding of the remainder of the strip to form overlapping ends. A pivoting holding means straddles the overlapping ends and moves the assembled plastic loop to a station where the overlapping ends are sonically welded together. The resulting strap is then applied in an enveloping fashion to a group of articles.

U.S. Pat. No. 4,310,369 to Miller et al, issued Jan. 12, 1982—A device and a method are disclosed for constructing cylinders from a multiply flexible web. Various process functions are carried out upon the web within forming units (30) which are equally spaced on a carousel apparatus. The processing stages are: an infeed station A where the web is wrapped around a mandrel (32), a heating and sealing stage C, cooling stages D, E and F, and a stripper/removal stage G.

U.S. Pat. No. 4,220,491 to Metcalf et al, issued Sep. 2, 1980—A device and proceess are disclosed for bonding two sheets together in controlled reistry. The apparatus utilizes a pair of hinged sheet-receiving platens which possess vacuum means for retaining a sheet in a desired manner. The platens have indexing means which position the sheets prior to bond formation.

U.S. Pat. No. 4,411,721 to Wishart, issued Oct. 25, 1983—A device and process are disclosed in which a fastener tape is automatically applied to a substrate. A pair of ultrasonic welding devices (22, 24) are provided at a work station (20). The handling of material within the machine is carried out by a system of pneumatic cylinders, pinch rollers and vacuum pads.

U.S. Pat. No. 4,532,166 to Thomsen et al, issued Jul. 30, 1985—A welded belt is disclosed which may be prepared, for example, by ultrasonically welding the overlapping ends of a web comprising thermoplastic materials.

U.S. Pat. No. 3,085,713 to Reiners, issued Apr. 16, 1963—A device and a method are disclosed for picking up and moving yarn coils with a vacuum gripper.

U.S. Pat. No. 3,375,777 to Techmann et al, issued Apr. 2, 1968—A device and process are disclosed in which a jaw type sealer is employed for sealing plastics.

U.S. Pat. No. 3,764,425, to Neff et al, issued Oct. 9, 1973—An apparatus and process is disclosed for forming tubular containers joined to an end closure. A flat sheet is fed to a mandrel and folded into a tube around the end closure and thereafter joined thereto to form a completed container. Various devices such as cutter mechanism, suction mechanism, heat sealing bar and a rotatable platform for multiple mandrels are also disclosed.

U.S. Pat. No. 4,222,811 to Enders issued Sep. 16, 1980—A device and process are disclosed for supplying tire components to a building drum (which can be of different size) or shaper for the construction of tires.

U.S. Pat. No. 4,285,750 to DeMartino issued Aug. 25, 1981—A device and process are disclosed for forming a rectangular sheet into a tubular shape having overlapped end portions that are sealed together. The device includes mandrels supported on a turret, cutting means and a sealing plate.

U.S. Pat. No. 4,359,675 to Miller III issued Nov. 16, 1982—An electrical tire building machine service is disclosed. The device includes a position guidance and drive tracking system.

U.S. Pat. No. 4,434,019 to Holloway, Jr. issued Feb. 28, 1984—A device and process are disclosed for making power transmission belts which include the wrapping of material around a drum.

U.S. Pat. No. 4,465,536 to Makino et al issued Aug. 14, 1984—A device and process are disclosed for automatically feeding a rubbery strip to a tire-building drum for the production of, for example, a green tire. The disclosure includes detachably retaining the leading end of the rubbery strip to the drum, wrapping the strip around the drum, and cutting the rubbery strip.

U.S. Pat. No. 3,939,033 to Grgach et al, issued on Feb. 17, 1976—An ultrasonic welding and cutting apparatus is disclosed which is designed for the manufacture of articles made of two superposed sheet materials. The apparatus includes an anvil means which exhibits a raised pattern of welding and cutting surfaces, and bearing surface means for limiting the motion of an ultrasonically vibration horn toward the anvil means and for distributing also the impact forces manifest upon the anvil means. The horn is provided with means for reducing the motional excursion of the frontal surface portion which impacts upon the bearing surface means.

U.S. Pat. No. 3,419,447 to Hewitt, issued Dec. 31, 1968—A method and apparatus are disclosed for bonding thermoplastic sheets to one another wherein adjacent sheets are overlapped to form an area of double thicknes and this area is then passed between a pair of ultrasonically vibrating tools. Overlapping edges running parallel to a butt joint are cut away.

U.S. Pat. No. 3,459,610 to Dijers et al, issued Aug. 3, 1966—A method is disclosed in which thermoplastic films are passed beneath a welding element and over an elevation in a base while in the vicinity of the elevation the films move free from the base, the direction of movement of the films being parallel to a plane in which the upper side of the elevation is curved, and the radius of curvature, measured in this latter plane, of the part of the welding surface of the welding elements situated opposite the upper side of the elevation being equal to at least five times the radius of curvature of the curved upper side of the elevation.

U.S. Pat. No. 3,754,425 to Bindernagek et al, issued Aug. 28, 1973—A rolling mill is disclosed having a roll line made up of a plurality of successive three roll stands, each defining a pass, which line includes at least two sizing passes disposed beyond a row of flat passes, the rolls of each sizing pass having sizing grooves shaped so that the reduction in cross section of the work in the pass defined by the sizing grooves is at an analytcal minimum when the work is in a non twisted state between passes.

U.S. Pat. No. 3,791,897 to Mesly, issued Feb. 12, 1974—An apparatus is disclosed which comprises a rotatable turret carrying three horizontally extending shafts, each capable of supporting a snowmobile track-receiving drum, of at least two vulcanizers mounted adjacent the turret and movable relative thereto, of an automatic rod applicating device adapted to come in circumferential abutment with the track-receiving drum, of a track-extracting device adapted to be interconnected with the drum, and of heating and cooling stations having conduits for connection with the drum.

U.S. Pat. No. 3,867,229 to Marra, issued Feb. 18, 1975—A collapsible tire building drum is disclosed. The drum is mountable on a spindle and has a plurality of minor drum support sections and articulated links pivotally connected at their respective outer ends to the sections and at their respective inner ends to spiders fixed on a central tubular shaft and with individual air cylinders operable to move in an axial plane, the respective hinges of the articulated links to collapse and to expand the drum. This arrangement facilitates separation of individual rigid segments of the drum from the tire built thereon.

U.S. Pa. No. 3,879,256 to Rust, Jr., issued Apr. 22, 1975—An apparatus for welding thermoplastic sheet-like elements is disclosed wherein two rows of staggered vibration transmitting members engage one side of the sheet-like elements against anvils located on the other side of said sheet-like elements to produce welds therebetween. Means are provided to advance the sheet-like elements between the anvils and vibration transmitting members, and compression members are located in the spaces between members in the first row of vibration transmitting members with which the sheet-like elements come into contact for maintaining the sheet-like elements uniformly flat across the width thereof.

U.S. Pat. No. 3,947,307 to Buchscheidt, issued Mar. 30, 1976—An ultrasonic welding apparatus is disclosed for a flexible fluid container fabricated of synthetic thermoplastic material having a welding surface, thin walls and a rim, and closed but for a single opening for fluid-tight welding of the connecting piece into the container, which is also fabricated of synthetic thermoplastic material. A welding ring focuses the ultrasonic energy to the welding surfaces. A ring-shaped base terminates the connecting piece.

U.S. Pat. No. 3,994,767 to Smith, issued Nov. 30, 1976—Apparatus for forming annular articles from elongated workpieces of thermoplastic material is disclosed, the apparatus being provided with clamps for grasping the ends of the workpiece, and a heating plate with two opposed surface; the clamps applying the ends of the workpiece to the plate to heat them and then bring the ends together.

U.S. Pat. No. 4,100,005 to McNeal, issued Jul. 11, 1978—A method of making a dynamoelectric machine insulator is disclosed in which, for example thermoplastic material is welded by ultrasonic welding.

U.S. Pat. No. 4,105,486 to Cantarutti, issued Aug. 8, 1978—Apparatus for transferring a tire component such as a belt and tread assembly is disclosed which includes an annular supporting frame with a plurality of radially movable component gripping sectors mounted on the frame at equal circumferentially spaced locations, each of the sectors being carried by a pair of radially spaced generally paralle links pivotally connected to the frame and to the sectors. An actuating ring is movable circumferentially of the frame and for each sector, an actuating link extends generally axially between the ring and at least one of each pair of links to pivot the links radially upon circumferentially movement of the actuating ring. In this manner, the sectors move radially uniformly. The frame is transported from one position to another to transfer the tire component.

U.S. Pat No. 4,519,857 to Clay, issued May. 28, 1985—An elastic band sealer for forming a continuous non-overlapping band from a source material is disclosed wherein the band sealer includes apparatus to extend a length of material from a source, apparatus to cut the material into a strip after it is extended, and apparatus to fuse the strip into a continuous non-overlapping band.

U.S. Pat. No. 4,683,017 to Figel et al, issued Jul. 28, 1987—A method and apparatus are disclosed for gripping a strap segment with two gripping members, for moving the gripping members together in a closed path to form a primary loop in the strap arouns at least one of the gripping members, and for feeding the strap to expand the primary loop to an expanded loop having a larger size for accommodating an article to be bound by the strap.

U.S. Pat. No. 4,033,768 to Weiloch, issued Jul. 5, 1977—A method is disclosed for preparing belts for an electrophotographic copying device. The method comprises applying a film of soluble material over a mandrel, applying a photoconductive layer, heat treating the photoconductive layer, applying a conductive material layer, applying a seamless heat shrinkable film of resin, removing the layered belt from the mandrel, dissolving the film of soluble material with a solvent, and turning the belt inside out. The belt may be trimmed to the desired width.

U.S. Pat. No. 3,673,024 to Erickson, issued Jun. 27, 1972—Apparatus and a method are disclosed for manufacturing belts. The method comprises winding fibrous webs over a pair of spaced rollers (column 1) and then heat treating the materials to adhere adjacent fibers to each other. An additional step of edge trimming is also disclosed.

U.S. Pat. No. 4,042,655 to Platt et al, issued Aug. 16, 1977—A method is disclosed for producing a nonwoven fabric, including the steps of drafting the fabric in a drafting zone having nip rolls, fusing a portion of the fibers in the fabric after drafting, and needling the drafted batt.

U.S. Pat. No. 4,078,961 to Aoki et al, issued Mar. 14, 1978—Apparatus and a method are disclosed for continuous supply of plastic film strip to a printing machine. The apparatus comprises a strip winding means, a switching means, strip cutting means and a heat-sealing means.

U.S. Pat. No. 4,173,314 to Curren et al, issued Nov. 5, 1979—Apparatus is disclosed for providing a continuous supply of web material to a web printer. The web material is fed from a first roll supported in a feed position, and when the first roll is near depletion, the leading end of a second roll is adhesively connected to the web of the first roll with that web then being severed.

U.S. Pat. No. 1,184,193 to Pireli Societa per Azioni, published Mar. 11, 1970—A method of and apparatus are disclosed for curing transmission belts on a collapsible mold.

When multiple batch handling techniques are utilized to fabricate belts, it is also often difficult to achieve uniform belt conicity and uniform quality. Moreover, because of differences in belt size requirements for different electrostatographic copiers, duplicators, printers and the like, a machine suitable for fabricating a belt of one diameter or width may not be readily useable to prepare a belt of a different diameter or width without encountering delays and expense. Further, lap joints formed with the leading edge over the trailing edge often cannot be readily changed with the trailing edge over the leading edge for new batches where one side of a belt differs from the other side.

Thus, the characteristics of belt fabrication systems exhibit deficiencies for rapidly manufacturing belts meeting precise tolerances and varying size and lap joint requirements.

SUMMARY OF THE INVENTION

It is an object of the invention to overcome the above-noted deficiencies by providing an apparatus and process for fabricating belts in which the leading edge of a web is conveyed from a supply roll in a straight path a predetermined first distance from a web receiving platform having a cutting edge, the web is cut at the cutting edge to form a web segment having the leading edge at one end and a trailing edge at the opposite end, the leading edge is conveyed a predetermined second distance in an upstream direction to form slack in the web, the lower surface of the web adjacent the trailing edge is inverted, the lower surface of the web adjacent the leading edge is inverted, the leading edge and the trailing edge are overlapped to form a lap joint on the upper surface of an elongated anvil having a centerline positioned substantially perpendicular to the straight path of the web to form a loop of the web segment loosely suspended from the joint formed by the overlapped leading edge and trailing edge, the loop of the web segment on the anvil is conveyed along either an arcuate path to position the joint substantially parallel to the direction of the straight path or conveyed vertically while maintaining the centerline of the anvil positioned substantially perpendicular to the straight path of the web and parallel to the plane of the web, the lap joint is welded on the anvil to form a belt welded at the joint, the loop of the web segment on the anvil is conveyed in an arcuate path in a direction opposite the previous direction until the centerline of the anvil traverses the straight path of the web, and the belt is removed from the anvil.

Because of the uniform shape achieved, the flexible belts prepared by the apparatus and processes of this invention are particularly useful for applications such as electrostatographic photoreceptors utilizing sensitive organic layers supplied in the form of long webs, especially long webs having an electrically conductive ground strip on one edge. In addition, precise control of the dimensions of the photoreceptors allows rapid changes in size for different production runs to fabricate belts of different diameters or different widths.

BRIEF DESCRIPTION OF THE DRAWINGS

A more complete understanding of the process and apparatus of the present invention can be obtained by reference to the accompanying drawings wherein:

FIG. 12 is a schematic, sectional plan view of an anvil for assembling and welding belts.

FIG. 13 is a schematic, sectional plan view of an anvil bearing an aligned pair of inverted gripper paddles.

DESCRIPTION OF THE PREFERRED EMBODIMENTS

Figure 1:
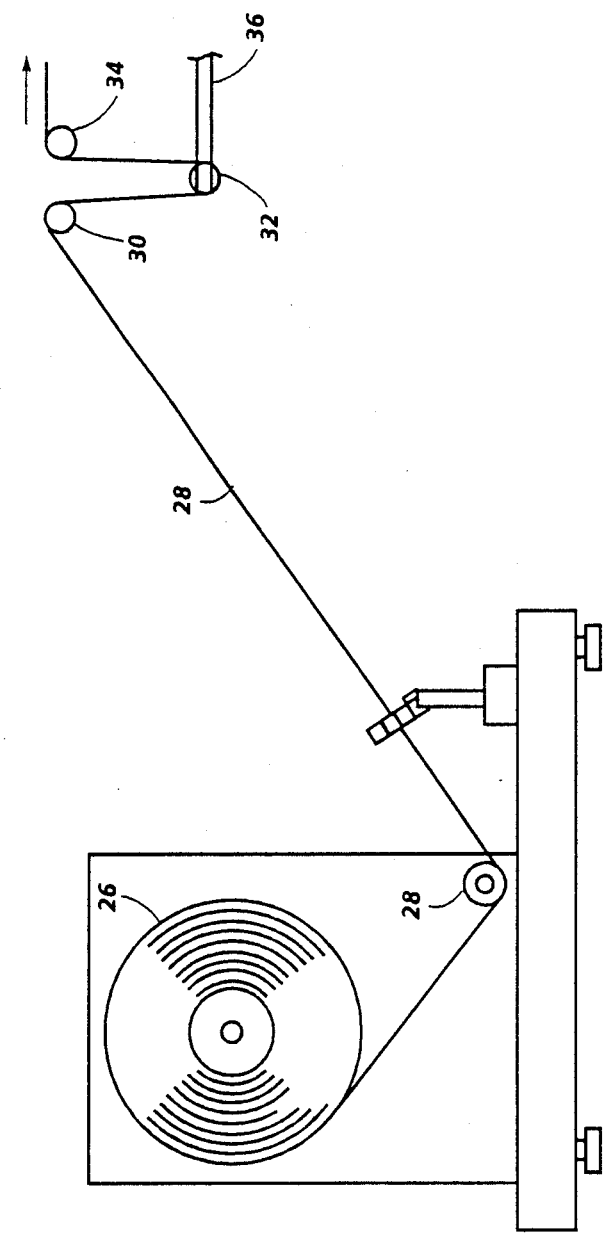
FIG. 1 is a schematic, sectional view in elevation of web supply and feed apparatus.

Referring to FIG. 1, a thin coated or uncoated thermoplastic web 10, is supplied by a supply roll 26 and fed around guide roll 28, air bearing 30, dancer roll 32 and air bearing 34. Air bearings 30 and 34 and dancer roll 32 each contain a hollow annular chamber (not shown) and a porous outer shell, e.g. sintered metal particles. Air bearings are particularly desirable where the web is a photoreceptor having an abrasion sensitive surface facing downwardly as the web is removed from the roll.

Figure 2:
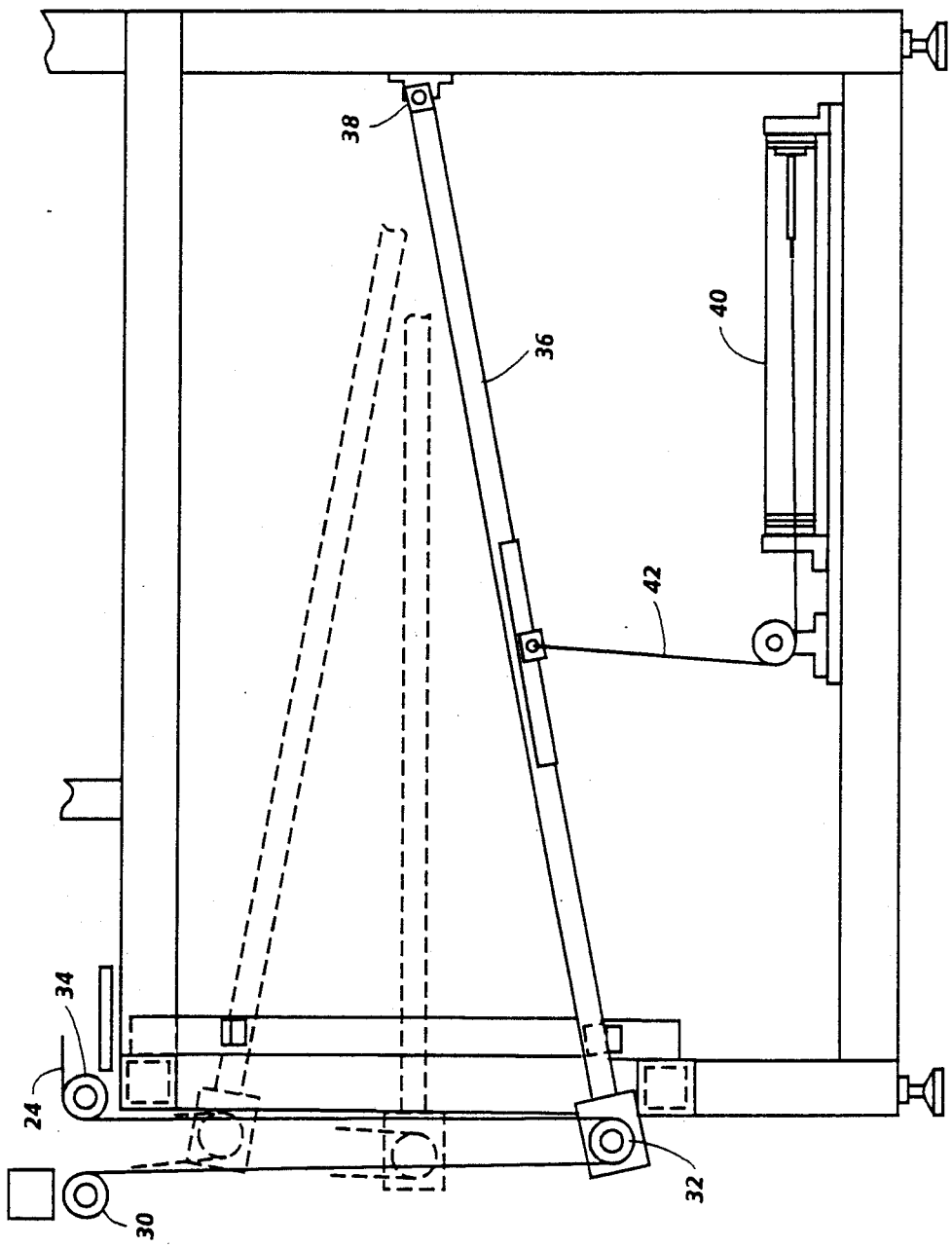
FIG. 2 is a schematic, sectional view in elevation of dancer roll apparatus.

As shown in FIG. 2, dancer roll 32 is supported by hollow idler arm 36 which is supported by and pivots around stationary shaft 38. Air bearings 30 and 34 and dancer roll 32 comprise hollow annular chambers (not shown) within a porous outer shell such as a shell of sintered metal particles. The dancer roll 32 and air bearings 30 and 34 are commercially available in the form of a porous metal tube, e.g. from Mott Metallurgical Corporation, Farmington Conn. Air under pressure from a suitable source is fed through conventional hoses (not shown) to the hollow annular chambers of dancer roll 32 (through hollow idler arm 36), air bearing 30 and air bearing 34 and allowed to escape through the porous shell to provide an air bearing which prevents damaging contact with the surfaces of web 24 and reduces friction that must be overcome to pull the web 24 from the supply roll 26. Slack in the web 24 is taken up by downward pressure applied to idler arm 36 by pneumatic cylinder 40 through connecting cable 42. If desired, supply roll 26 may be fitted with a suitable adjustable brake or drag (not shown) to regulate the amount of tension employed to pull web 24 from supply roll 26.

Figure 3:
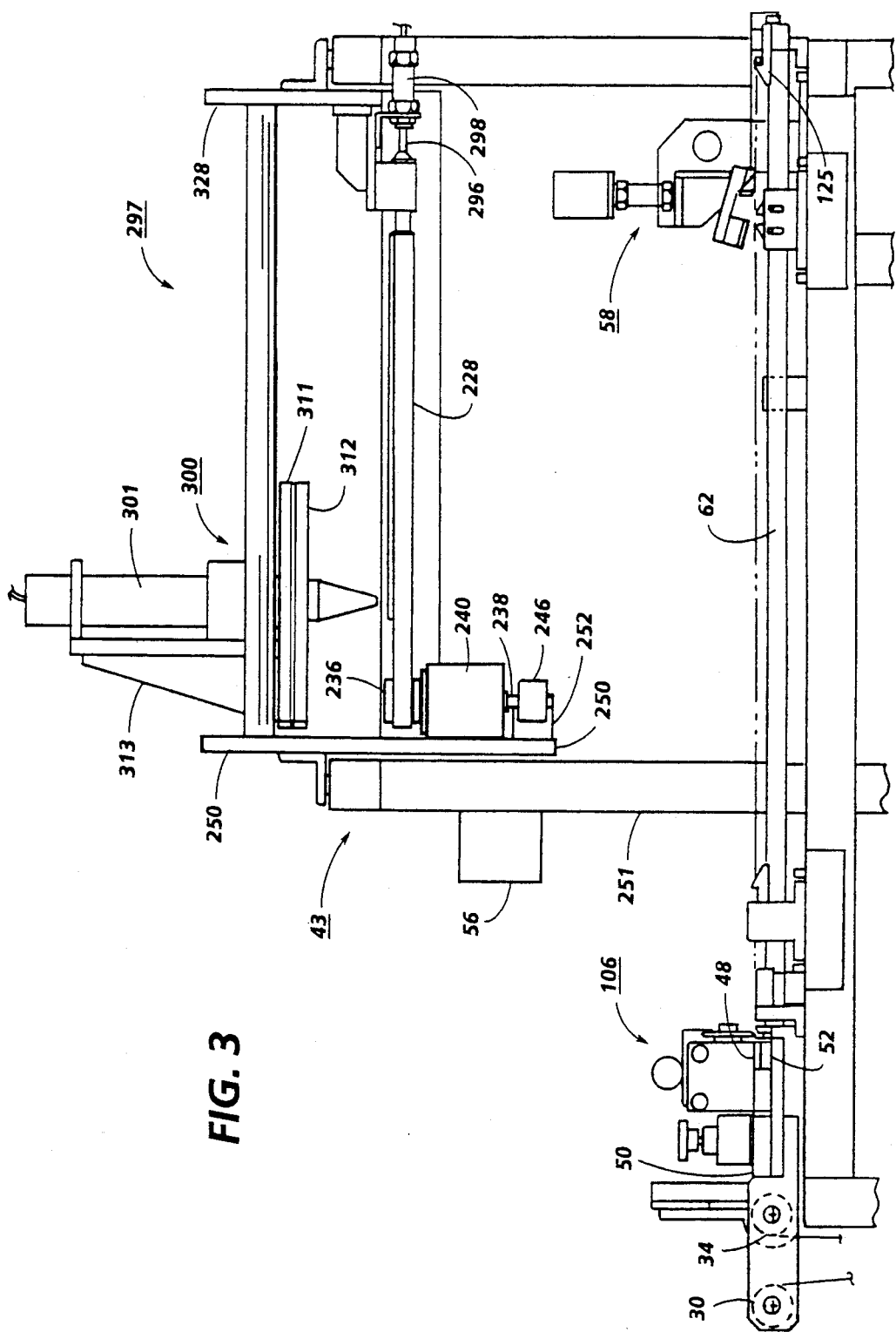
FIG. 3 is a schematic, sectional view in elevation of a web loop forming apparatus.
Figure 4:
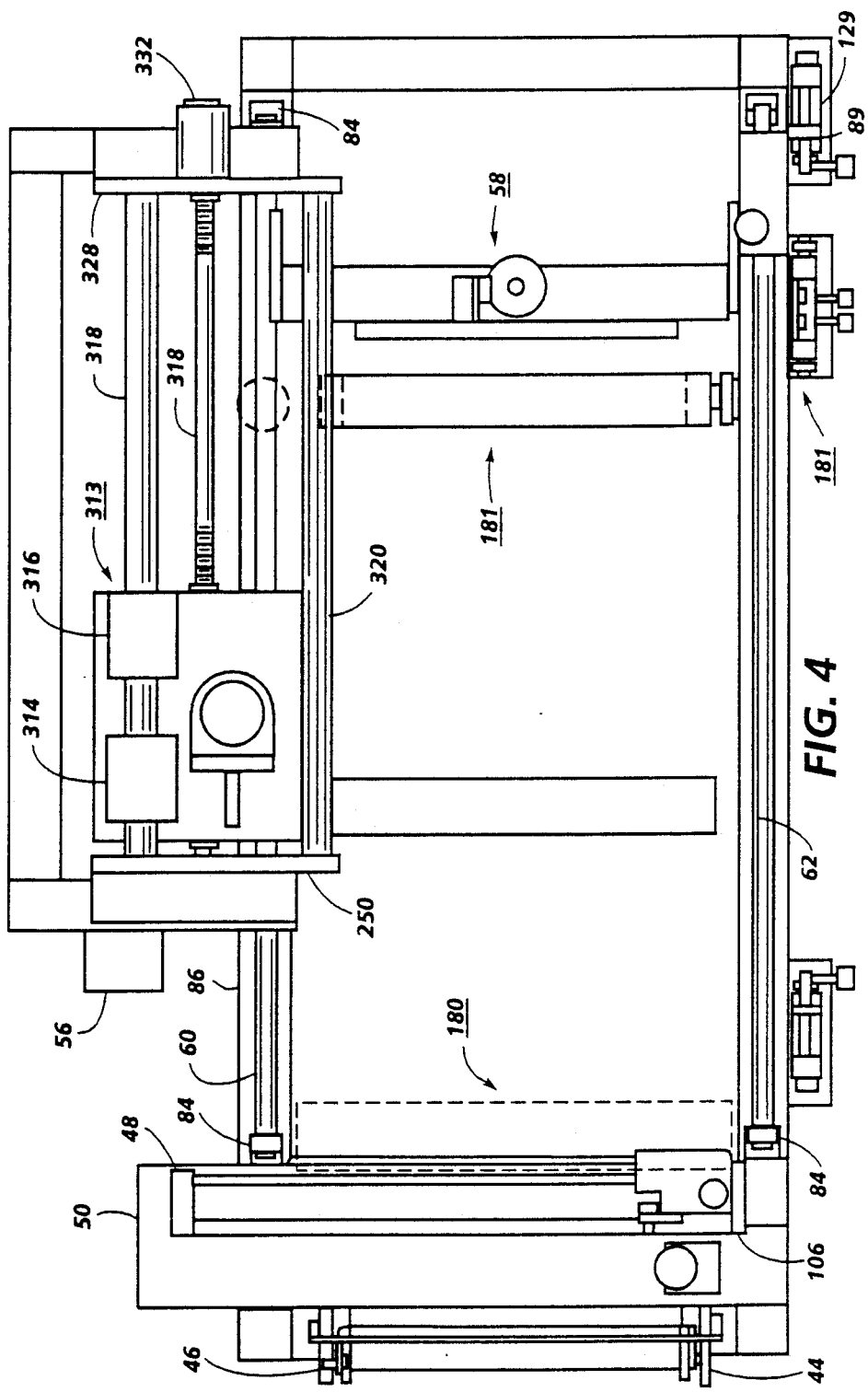
FIG. 4 is a schematic, sectional plan view showing a web loop forming apparatus.
Figure 5:
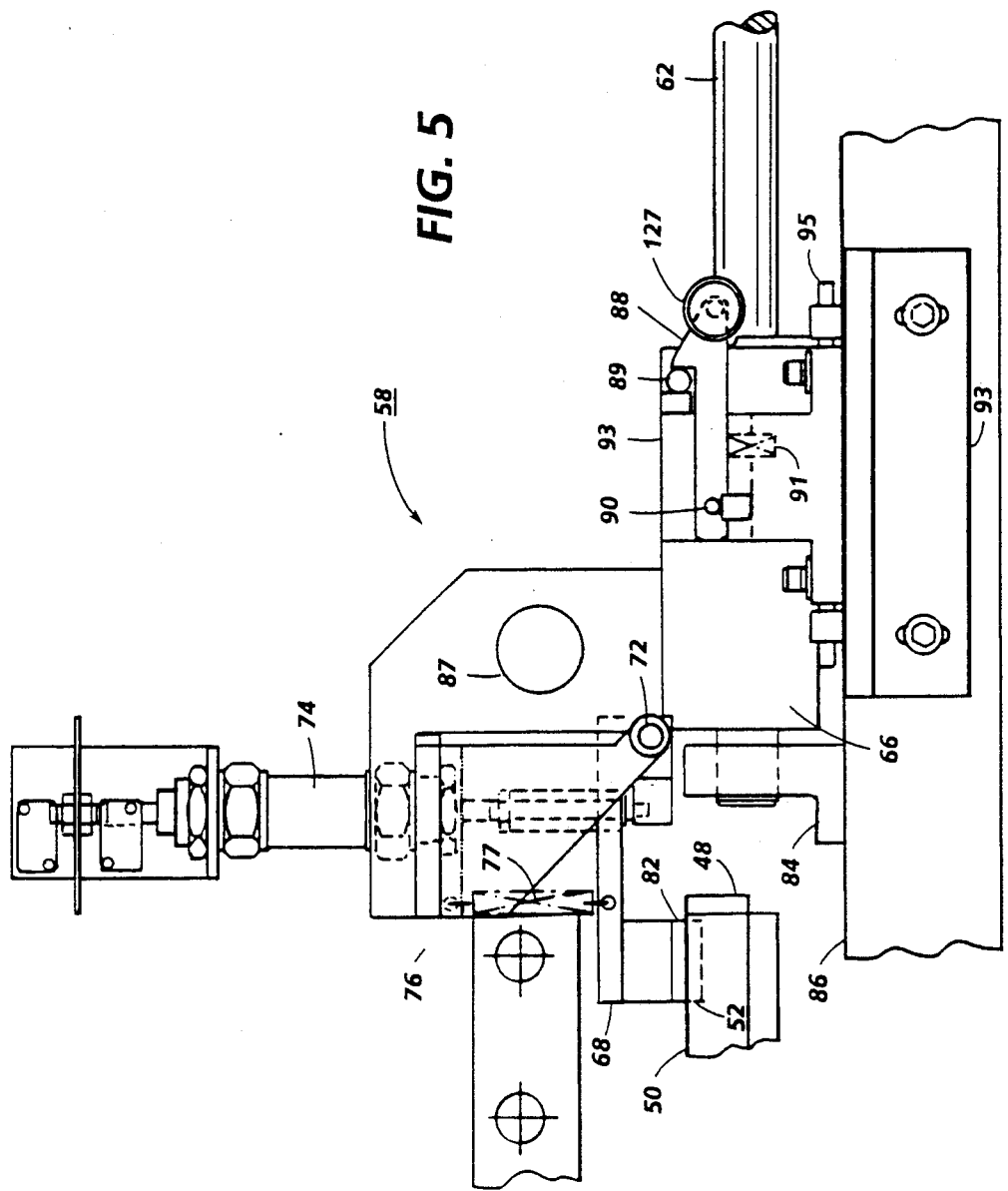
FIG. 5 is an expanded schematic, sectional view in elevation of a web pick up assembly adjacent a cutting edge on a web receiving platform.

A belt loop forming apparatus 43 is shown in greater detail in FIGS. 3, 4 and 5. The web 24 supplied by supply roll 26 is passed around stationary air bearings 30 and 34. The "S" shape of the path of web 24 around air bearings 30 and 34 imparts sufficient lateral strength to web 24 to allow edge guides 44 and 46 to laterally position the web 24 without buckling as it travels through belt loop forming apparatus 43. If desired, the "S" shaped path may be extended to provide a longer serpentine path for web 24. The leading edge of web 24 is initially fed to the cutting edge 48 of web receiving platform 50 and held against web receiving platform 50 by a partial vacuum provided by vacuum shoe 52 which is connected through an underlying vacuum plenum (not shown) to a suitable vacuum source (not shown). Any suitable vacuum shoe may be utilized. Typical vacuum shoes comprise one or more rows of holes of any suitable shape over a vacuum plenum, one or more rows of shallow grooves of any suitable shape connected by passages to an underlying vacuum plenum, a porous member of sintered particles over a vacuum plenum, and the like. The creation and removal of a vacuum in vacuum shoe 52 may be accomplished by activating a suitable solenoid operated valve (not shown). The valve may be a conventional solenoid operated valve which is commercially available, for example from Mac Valves, Inc., Wixom, Mich. Positive pressure, a vacuum or ambient air pressure may be supplied from any suitable conventional source by suitable means such as ordinary air coupling lines (not shown). The expression "vacuum" as employed herein is intended to mean a partial vacuum rather than a complete vacuum. Similarly, electrical power to drive electrical equipment such as motors, solenoids, servomotors and the like are supplied through suitable wiring and conventional suitable electrical switching. The valves and switches may be actuated through suitable circuitry in response to an operation of an operator of the belt loop forming apparatus, e.g. manual movement of a handle or component of the belt loop forming apparatus can open or close a microswitch to open or close an electrical circuit. Expressions such as "activation", "supplying power", "inactivation" and the like are well known terms intended to include opening or closing solenoid operated valves or electrical switches to provide or discontinue providing positive pressure, a vacuum, ambient air pressure, electricity and the like. Thus, the control functions in the apparatus of this invention are generally synchronized and integrated by an operator. Activation of an operation by an operator may be utilized to activate any suitable programmable controller which thereafter responds to various typical inputs including, for example, inputs from limit switches, timers, encoders, proximity sensors, counters and the like and utilizes these inputs for sequencing program outputs to activate electric switches, solenoid operated valves that either vent a vacuum shoe, such as vacuum shoe 52, to the ambient atmosphere or connect the vacuum shoe to an evacuated chamber (not shown), and the like. Termination of an activated component may be effected by any suitable and conventional means such as by programmable controller 56 o(such as an Allen Bradley Programmable Controller, Model No. 205 or Model No. 217) or by suitable limit switches.

Figure 6:
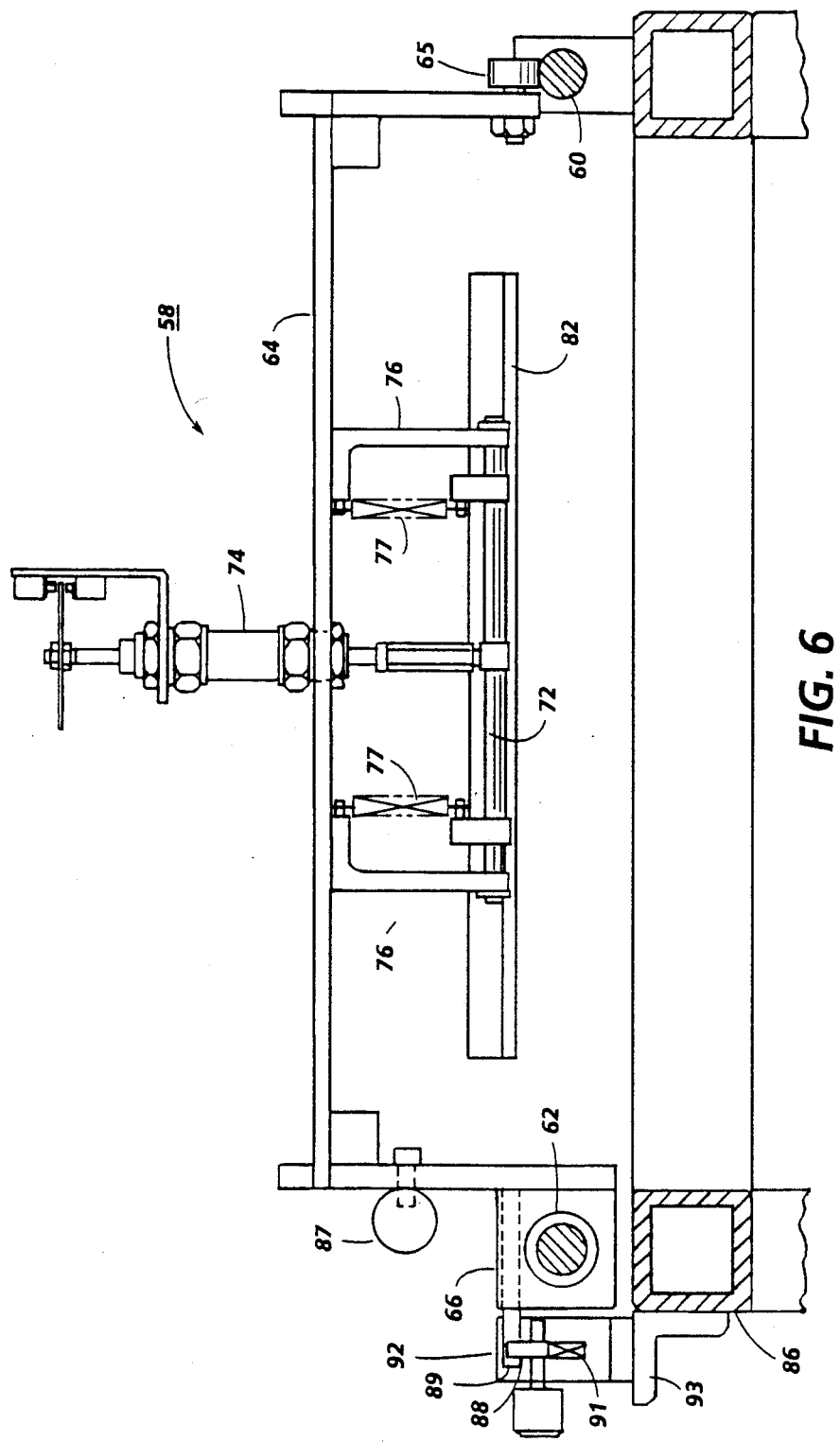
FIG. 6 is an expanded schematic, sectional view in elevation of a web pick up asembly.
Figure 7:
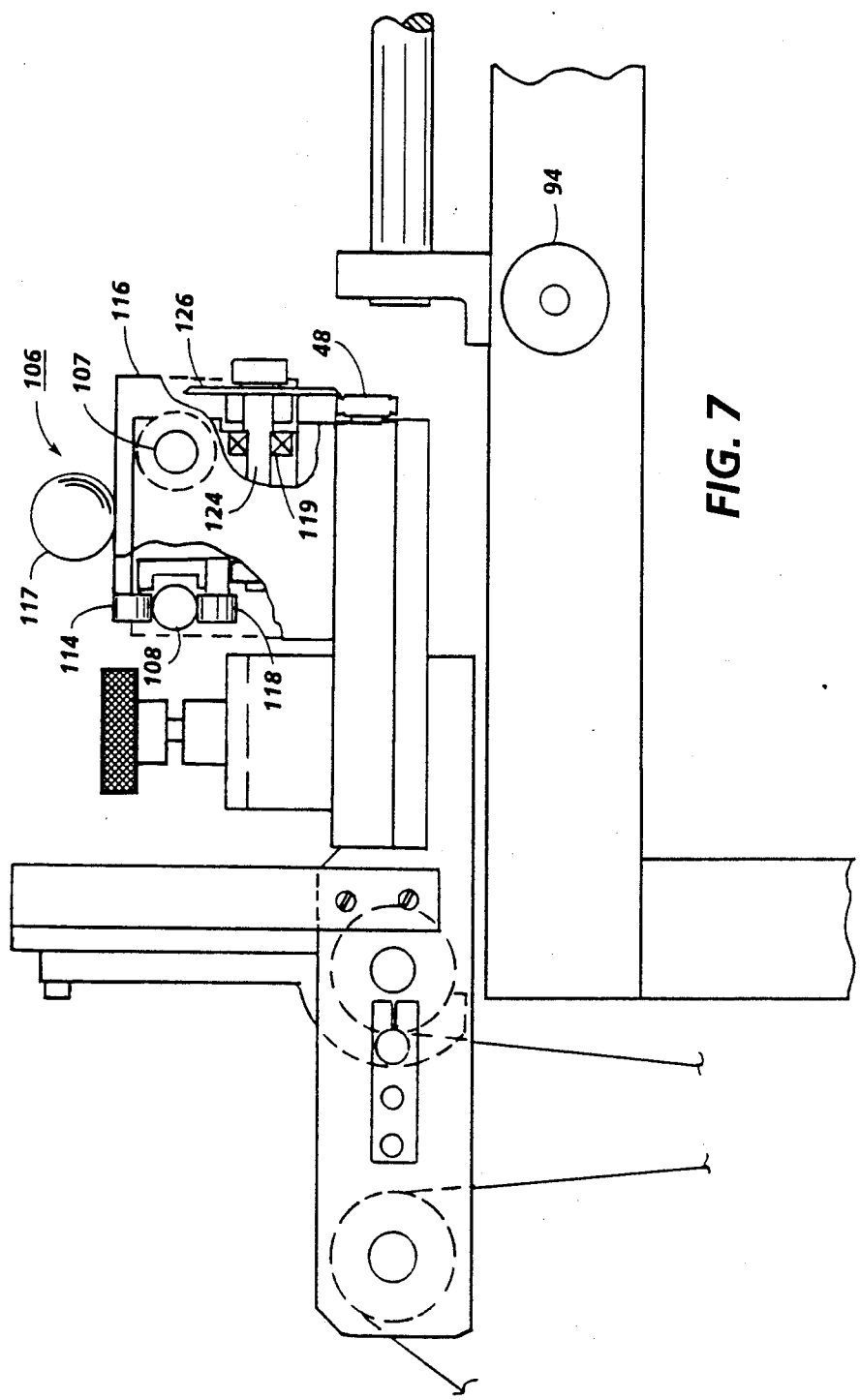
FIG. 7 is an expanded schematic, sectional view in elevation of a web cutting assembly.
Figure 8:
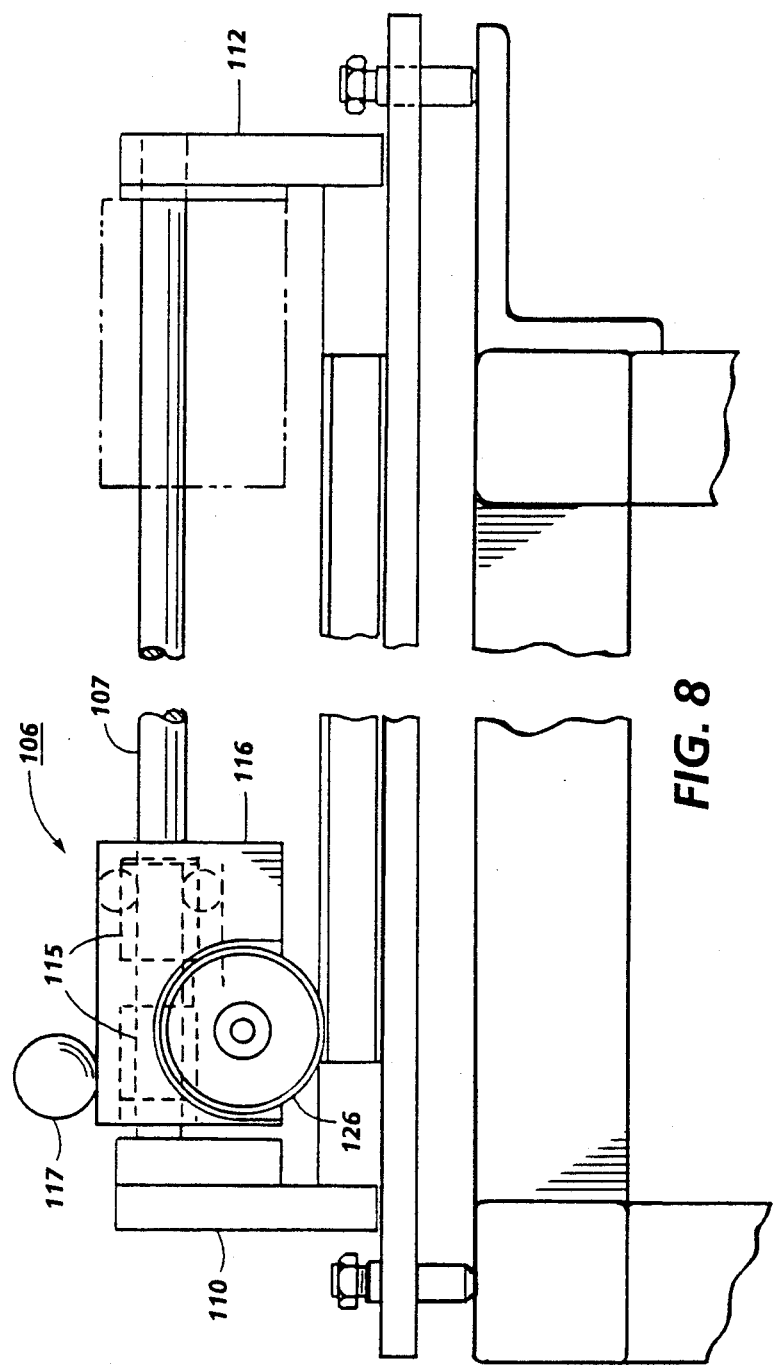
FIG. 8 is another expanded schematic, sectional view in elevation of a web cutting assembly.
Figure 9:
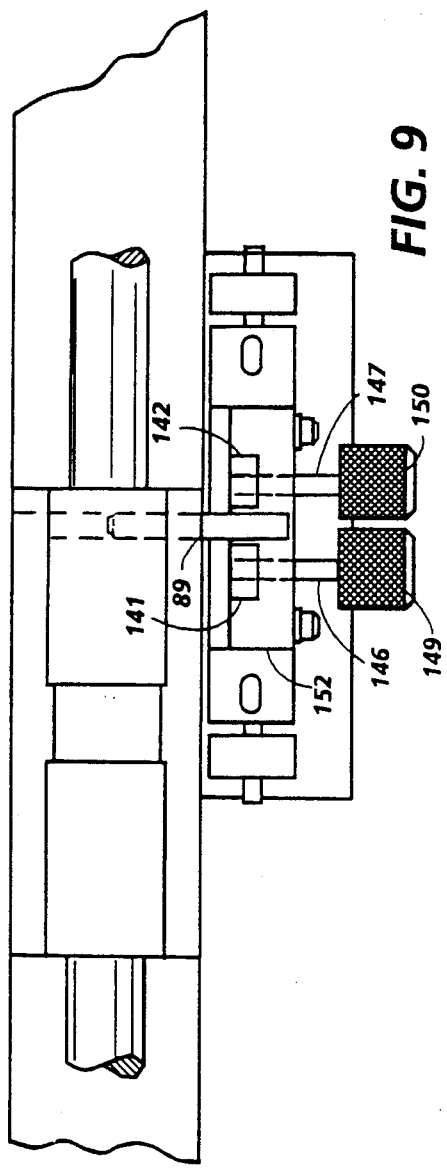
FIG. 9 is an expanded schematic, plan view in elevation of a releasable retaining assembly to temporarily retain a web pick up assembly at an intermediate position downstream from the cutting edge.
Figure 10:
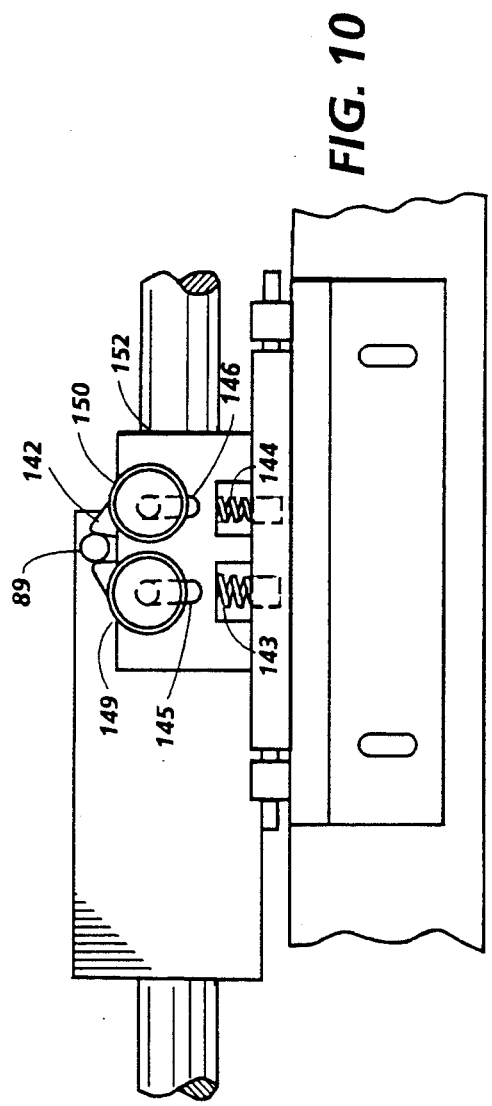
FIG. 10 is an expanded schematic, sectional view in elevation of a releasable retaining assembly to temporarily retain a web pick up assembly at an intermediate position downstream from the cutting edge.

As further illustrated in FIGS. 4, 5, and 6 reciprocatable web pick-up assembly 58 reciprocates to and from a location above web receiving platform 50 and web 24 and is supported on a pair of guide rods 60 and 62. Web pick-up assembly 58 comprises a platform 64 having an inverted square "U" shape, one side of which is slideably supported on guide rod 60 by cam follower rollers 65 (only one shown) and the other side being slideably supported on guide rod 62 by bearing block 66. Any suitable slide support system such as, for example, a Thomson slide available, for example, from Thomson Industries, Manhasset, N.Y. may be employed. Web pick-up assembly 58 also comprises pivotable plate 68 which is supported by shaft 72 when solenoid or pneumatic cylinder 74 is activated. Activation of solenoid 74 is effected by programmable controller 56 which supplies electrical power through conventional wiring (not shown). Shaft 72 is supported by a pair of end plates 76 which are fastened to platform 64. Pivotable plate 68 is biased in an upward direction by a pair of springs 77. A vacuum shoe 82 is mounted on the bottom of the free swinging end of pivotable plate 68. Pivotable plate 68 and vacuum shoe 82 extend transversely across substantially the entire width of web 24. The length of vacuum shoe 82 is normally slightly shorter than the width of web 24. Any suitable vacuum shoe, such as a shoe similar to the previously described vacuum shoe 52, may be utilized. The creation and removal of a vacuum in a vacuum plenum (not shown) overlying vacuum shoe 52 is accomplished by programmable controller 56 which controls suitable conventional solenoid activated valves which either connect vacuum plenum to an evacuated chamber or vent the vacuum plenum to the ambient atmosphere. Alternatively, the creation and removal of a vacuum in a vacuum plenum (not shown) overlying vacuum shoe 52 may be accomplished manually by an operator activating a switch. The guide rods 60 and 62 are supported by end brackets 84 mounted on frame 86. Reciprocation of web pick-up assembly 58 between a home position (shown on the right in FIG. 3), an advanced shear position (illustrated in FIG. 5) and other locations on guide rods 60 and 62 is preferrably effected manually by an operator who guides web pick-up assembly 58 by merely gripping and moving knob 87 mounted to platform 64 toward vacuum shoe 52 until latch 88 engages pin 89. Pin 89 is rigidly mounted on bearing block 66. Latch 88 is supported by and pivots on shaft 90 and is biased in an upward direction by spring 91. Shaft 90 is secured to frame 86 by brackets 92 and 93. The advanced shear position of web pick-up assembly 58 aligns vacuum shoe 82 directly over vacuum shoe 52 so that vacuum shoe may accept transfer of the leading edge of web 24 after web 24 is severed. After an operator moves web pick-up assembly 58 toward supply roll 26 until latch 88 engages pin 89 thereby aligning vacuum shoe 82 directly over vacuum shoe 52, the operator may activate a palm switch 94. Palm switch 94 is essentially a conventional push button switch having a large button that can conveniently be activated by striking the button with the palm of the hand. Palm switch 94 is electrically connected to a programmable controller 56 by suitable wiring (not shown) to supply electrical signals to the programmable controller 56 indicating the relative location of web pick-up assembly 58. Any suitable encoder may be employed. A typical encoder is an Allen Bradley Encoder, Model No. 845N-SJD-NY-CRYI available from Allen Bradley. The movement of vacuum shoe 82 downwardly toward vacuum shoe 52 is accomplished by programmable controller 56 which controls the extension and retraction of solenoid or pneumatic cylinder 74 to lower and retract vacuum shoe 82. Generally, the spacing of vacuum shoe 82 from cutting edge 48 is predetermined to achieve the degree of belt overlap desired in the final belt loop seam. Any suitable means such as adjustment screw 95 may be used to space vacuum shoe 82 from cutting edge 48 to achieve the desired amount of belt overlap in the belt loop seam. The programmable controller 56 also activates a valve (not shown) to supply a partial vacuum from a suitable and conventional source to vacuum shoe 82 and, after a momentary delay, terminates supply of a partial vacuum from a suitable source to vacuum shoe 52. This sequence transfers the leading edge of web 24 from vacuum shoe 52 to vacuum shoe 82.

Also shown in FIGS. 3, 4, 7 and 8 is a web cutter assembly 106 comprising guide rods 107 and 108 secured at one end to side plate 110 and at the other end to side plate 112. Side plates 110 and 112 are attached to and supported by web receiving platform 50. Slideably mounted on guide rods 107 and 108 are cam follower rollers 114 and bearing blocks 115, respectively, which support cutter blade housing 116. The cutter blade housing 116 is moved back and forth on guide rods 107 and 108 shaft by an operator who grips knob 117 and either pushes or pulls the cutter blade housing. If desired, the cutter blade housing 116 may be moved by other suitable means such as by compressed gas which moves a magnet in a hollow nonmagnetic rod, in place of rod 107. Bearing block 116 can be made of magnetically attactable material so that movement of the attractive magnetic force from the magnet piston attracts the magnetic bearing block 116 and causes magnetic bearing blocks 116 to slide back and forth on hollow nonmagnetic shaft 107 in unison with the magnet piston. A magnetic reciprocating drive system of the type illustrated is available, for example, from Festo Corporation, Hauppauge, N.Y. Any other suitable reciprocating drive means may be substituted for the magnetic device. Typical reciprocating drive means include ball and lead screw, pneumatic piston, servomotor, and the like. Mounted to cutter blade housing 116 are a pair of bearings 118 and 119 which support a freely rotatable shaft 124 which carries a disc shaped cutting blade 126. If desired, other suitable cutting means may be substituted for the disk blade. Typical cutting devices include laser cutters, straight edged knives, guillotine shear, and the like. If desired, actuation and reciprocation of disc shaped cutting blade 126 along cutting edge 48 may also be accomplished by programmable controller 56 to control suitable conventional valves (not shown) connected to a source of compressed gas that is supplied to hollow nonmagnetic guide rod 107. In order to avoid collision between cutting blade 126 and web pick-up assembly 58 when web pick-up assembly 58 is traveling to its advanced web leading edge pick-up position, cutting blade 126 is moved to its own home position (shown in FIG. 4) when it is not severing web 24.

Referring to FIGS. 3, 4, 9 and 10, after the leading edge of web 24 transferred from vacuum shoe 52 to vacuum shoe 82, an operator grips and depresses knob 127 with one hand to unlatch latch 88 and with the other hand grips knob 87 and moves web pick-up assembly 58 away from web supply roll 28 until latch 129 engages pin 89 at a home position. This operation pulls web 24 a predetermined distance from cutting edge 48. The latch 129 arrangement is identical to and a mirror image of the latch 88 arrangement described above and illustrated in FIGS. 4 and 5.

With reference to FIGS. 3, 4, 8 and 10, an intermediate latching assembly 140 is shown. Intermediate latching assembly 140 comprises a pair of latching fingers 141 and 142 that are mirror images of each other. These latching fingers are biased in an upward direction by springs 143 and 144. Extending from these latches through slots 145 and 146 are pins 147 and 148, respectively. Mounted on pins 147 and 148 are knobs 149 and 150, respectively. Slots 145 and 146 are located in the outer wall of latch housing 152.

Figure 11:
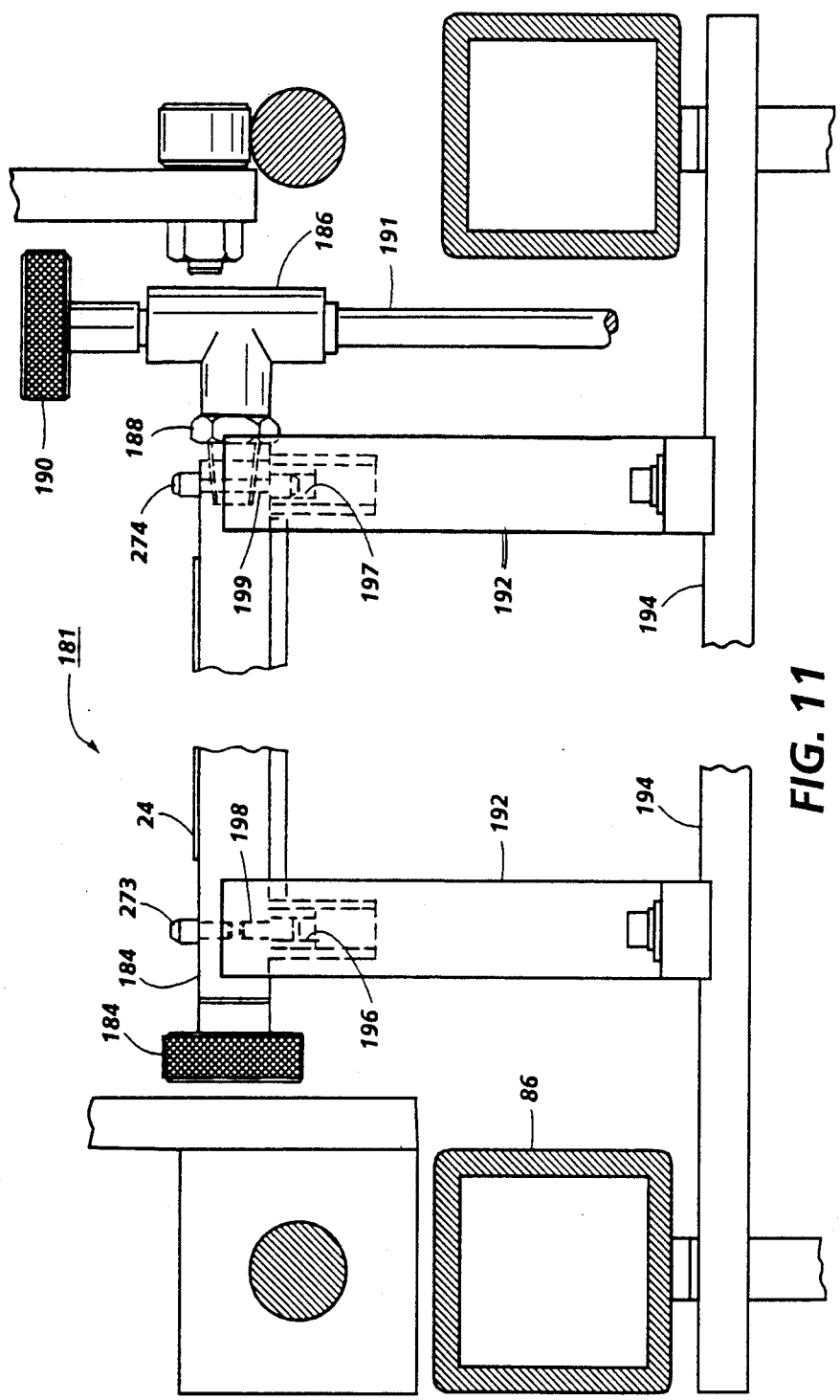
FIG. 11 is a schematic, sectional view in elevation of an invertable gripper paddle.

Illustrated in FIGS. 4, 11 and 12 are invertable gripper paddle assemblies 180 [shown in FIGS. 4 (phantom block) and 12] and 181. Since invertable gripper paddle assemblies 180 and 181 are mirror images of each other a description of one is essentially a description of the other. Invertable gripper paddle assembly 181 comprises a vacuum paddle 182 within which is located a vacuum plenum (not shown) which extends along the length of vacuum paddle 182. Similarly, invertable gripper paddle assembly 180 comprises a vacuum paddle 183 (see FIG. 13) having a mirror image configuration of vacuum paddle 182. The vacuum plenum is connected through a series of holes (not shown) to the upper surface of vacuum paddle 182. These holes may be connected by a shallow groove pattern identical to the arrangement to be described later in greater detail with reference to FIG. 12. The length of the groove pattern is normally slightly shorter than the width of web 24. A fixed knob 184 is secured to one end of vacuum paddle 182 and a hollow "T" connection 186 is mounted to the other end through a hollow swivel connector 188. A knob 190 and flexible hose 191 are attached to opposite sides of "T" connection 186. Any suitable connector may be used for hollow swivel connector 188. A connector of the type illustrated is available, for example, from Legris, Inc., Rochester, N.Y. The hose leads to a suitable valved source of vacuum (not shown). The vacuum plenum is connected by hollow swivel connector 188, hollow "T" connection 186, flexible hose 191, a control valve (not shown) and other suitable fittings to a vacuum source. Vacuum paddle 182 is supported at a predetermined location below web 24 by a pair of pedestals 192 and 193. Pedestals 192 and 193 are bolted to plate 194 which is in turn secured to frame 86. Drilled alignment hole 196 and 197 are provided in the tops of pedestals 192 and 193. Alignment dowels 198 and 199 are fastened to the bottom of vacuum paddle 182 and, in combination with alignment holes 196 and 197, ensure that vacuum paddle 182 position is accurately aligned with respect to web 24. Activation and inactivation of vacuum plenums in invertable gripper paddle assemblies 180 and 181 are independently accomplished by programmable controller 56 to control conventional valves that connect the vacuum plenums to a source of vacuum or to vent the vacuum plenums to the atmosphere. The hollow swivel connector 188 allows hose 191 and knob 190 to remain essentially upright when an operator grips knobs 184 and knob 190 and inverts vacuum paddle 182 by rotating knob 184.

Referring to FIGS. 3, 4 and 12, an elongated anvil 228 is illustrated comprising a free end 230 and a supported end 232. Anvil 228 is horizontally cantilevered from a rotatable shaft 236 mounted to journal shaft 238 passing through journal box 240 into a rack and pinion housing 246. Journal box 240 and rack and pinion housing 246 are secured to plate 250 which is secured to frame 251. Rack and pinion housing 246 contains conventional rack and pinion gears (not shown) which adapted to rotate journal shaft 238 when the rack (not shown) in housing 246 is driven by reversible pneumatic cylinder (or other suitable device such as an electric motor) 252 attached to plate 250. Shaft 236 is rotated when it is necessary to swing free end 230 of anvil 228 between a location in which the axis of anvil 228 is parallel to the path of reciprocatable web pick-up assembly 58 and a location in which the axis of anvil 228 is perpendicular to the path of reciprocatable web pick-up assembly 58. Timely actuation of pneumatic cylinder 252 is accomplished by programmable controller 56 or by operator activation of a palm switch.

In FIG. 12, elongated anvil 228 is shown having a vacuum groove 264 positioned along one side of a hard metal strip insert 265 extending along the length of the upper surface of elongated anvil 228. Hard metal strip insert 265 may comprise any suitable material such as stainless steel, A4 tool steel, 02 steel, and the like, which can withstand abrasive conditions such as those encountered during belt lap joint welding. Vacuum groove 264 should be positioned under a sufficient width of the inverted surface of invertable gripper paddle assemblies 180 and 181 to attract and retain both ends of a belt loop formed during the previous cutting operation. Hard metal strip insert 265 is normally at least as long as the lap joint on the overlying web loop. A plurality of passages 270 distributed along vacuum groove 264 connect vacuum groove 264 to an interior vacuum plenum (not shown). Alignment holes 271 and 272 are provided on the upper surface of anvil 228 to receive dowel pins 273 and 274 (see FIGS. 11 and 12), respectively, and to align the vacuum groove 270 with the vacuum groove (not shown) on the inverted surface of invertable gripper paddle assembly 181. A mirror image arrangement of vacuum groove, passages and alignment holes are provided on the other side of hard metal strip insert 265 on the upper surface of anvil 228. These features are hidden from view in FIG. 12 by the presence of invertable gripper paddle assembly 180. The vacuum grooves on the upper surface of anvil 228 are independently connected through interior vacuum plenums (not shown) through flexible hoses airways (not shown) to suitable electrically activateable valves (not shown).

As illustrated in FIGS. 12 and 13, the free end of elongated anvil 228 contains a shot pin receiving hole 294 utilized in combination with shot pin 296 located at a welding station 297 (See FIG. 3) to prevent undue deflection of the free end of elongated anvil 228. Shot pin 296 is extended and retracted by supplying compressed air to a pneumatic cylinder 298 secured to frame 299.

Any suitable conventional solenoid operated valve may be employed to provide vacuum or pressure to the components of this invention. Positive pressure, a vacuum or ambient air pressure may be supplied from any suitable conventional source to the components by conventional means such as suitable air coupling lines (not shown). Conventional electrical switching is employed to couple or uncouple electric motors with an electrical power source through suitable circuitry in response to a signal from a suitable programmable controller 56 such as a Allen Bradley Programmable Controller, Model No. 205 or Model No. 217.

Referring to FIGS. 3 and 4, an ultrasonic belt welding station 297 comprising an ultrasonic horn with transducer assembly 300 is illustrated. A solenoid (not shown) is mounted to upper plate 311 to extend or retract ultrasonic horn and transducer assembly 300 in a vertical direction. The web lap joint (not shown) formed by the overlapping segment ends of thermoplastic web 24 is supported by the upper surface of anvil 228 and held in place below the path of ultrasonic horn and transducer assembly 300 by suction from vacuum groove 264 (see FIG. 12) on one side of hard metal strip insert 265 and a vacuum groove (not shown) on the other side of hard metal strip insert 265, the latter vacuum groove being a mirror image of vacuum groove 264. The ultrasonic horn and transducer assembly 300 is supported by the lower end of a vertically reciprocateable shaft (not shown) extending from the lower end of solenoid (not shown) mounted to the upper hinged half 311 of a substantially horizontally reciprocateable carriage 313. One side of the lower hinged half 312 of carriage 313 is suspended from pillow blocks 314 and 316 which in turn slide on horizontal bar 318. The other side of carriage 313 is suspended from a pair of cam followers (not shown) that roll on the outer surface of horizontal bar 320. A rotatable lead screw 322 drives horizontally reciprocateable carriage 313 through ball nut (not shown) secured to carriage 313. Horizontal bars 318 and 320 as well as lead screw 322 are supported at each end by plates 250 and 328 which are secured to frame 251 and 299, respectively. Lead screw 322 is rotated by an electric motor 332 which is also supported by plate 328. A shot pin 296 is mounted to frame 299 and is adapted to mate with shot pin receiving hole 294 at the free end of anvil 228 when anvil 228 is indexed into position for welding of the belt lap joint. An adjustable set screw (not shown) is positioned to extend downwardly from the upper hinged half 311 of carriage 313 to assist in maintaining a predetermined spacing between the bottom of the ultrasonic horn with transducer assembly 300 and the top of anvil 228 and to ensure a uniform pressure on the web lap joint as the bottom of the ultrasonic horn traverses the lap joint. The end of the set screw rests against the top of lower hinged half 312 of carriage 313. The upper hinged half 311 and lower hinged half 312 of carriage 313 are joined by a hinge comprising a thin metal shim (not shown) fastened to upper hinged half 311 and to lower hinged half 312 by bolted plates not shown). The hinge allows upper hinged half 311 of carriage 313 and ultrasonic horn with transducer assembly 300 to pivot along the hinge during welding to compensate in a substantially vertical direction for any irregularities encountered along the lap joint 301 during welding. An air bellows (not shown) is positioned between upper hinged half 311 and lower hinged half 312 of carriage 313 to adjust the pressure of the bottom of the ultrasonic horn 300 against the web lap joint, e.g. to function as a counterbalance.

Figure 14:
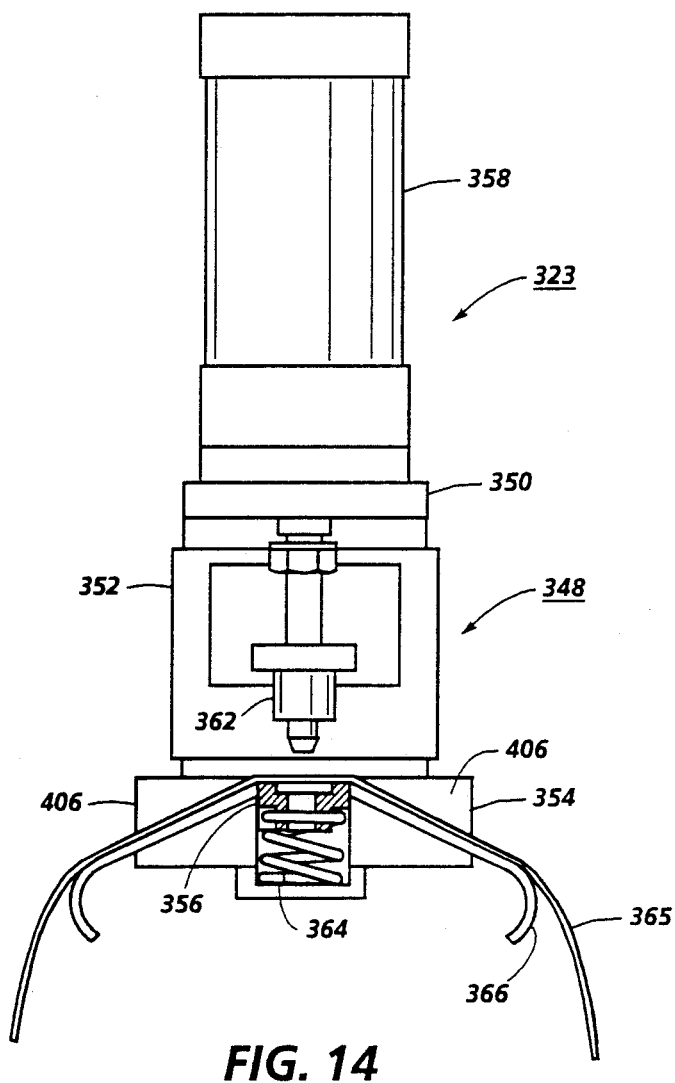
FIG. 14 is a schematic, sectional view in elevation of a notching assembly for removing any flashings from welded belts.

Upon completion of welding of the lap joint (not shown) of web 24 at belt welding station 297, the welded belt contains flashings at each end of the welded lap joint. These joints extend beyond the sides of the belt and are undesirable for many machines such as electrostatographic copiers, duplicators and copiers that require precise edge positioning of the belts during machine operation. However, some machines that require precision edge positioning, require it on one side only so that notching or trimming of the other side is not essential. Thus, the freshly welded belt is removed from anvil 228 by the operator and transferred to a belt notching station 323 (see FIG. 14). If desired, belt notching station 323 may be mounted at a suitable location on the belt loop forming apparatus 43 such as to frame 302. Belt notching station 323 comprises a "C" shaped bracket assembly 348 comprising a long cantilevered upper horizontal flange 350, a short vertical plate 352 and a long cantilevered horizontal flange 354 which positions a notching device at each end of a welded lap joint. Because FIG. 14 is a view in elevation of the end of a welded lap joint, the closer notching device blocks from view the other identical notching device. However, it is apparent that a description of the closer notching device also accurately describes the other. The active components of belt notching station 323 are supported by cantilevered upper horizontal flange 350 over a die 356 mounted in cantilevered horizontal flange 354. Horizontal flange 350 carries a pair of mounted pneumatic cylinders (only pneumatic cylinder 358 is shown). Cylinder 358 is adapted to extend and retract punch cutter 362 into die 356 aligned with the upper surface of horizontal flange 354. A spring 364 serves to cushion the impact of punch cutter 362 into die 356. Punch cutter 362 and the cutter hidden from view remove the weld flashings at each end of the welded belt lap joint of belt 365. Belt 365 is supported on a sheet metal table 366 during the notching operation.

Figure 15:
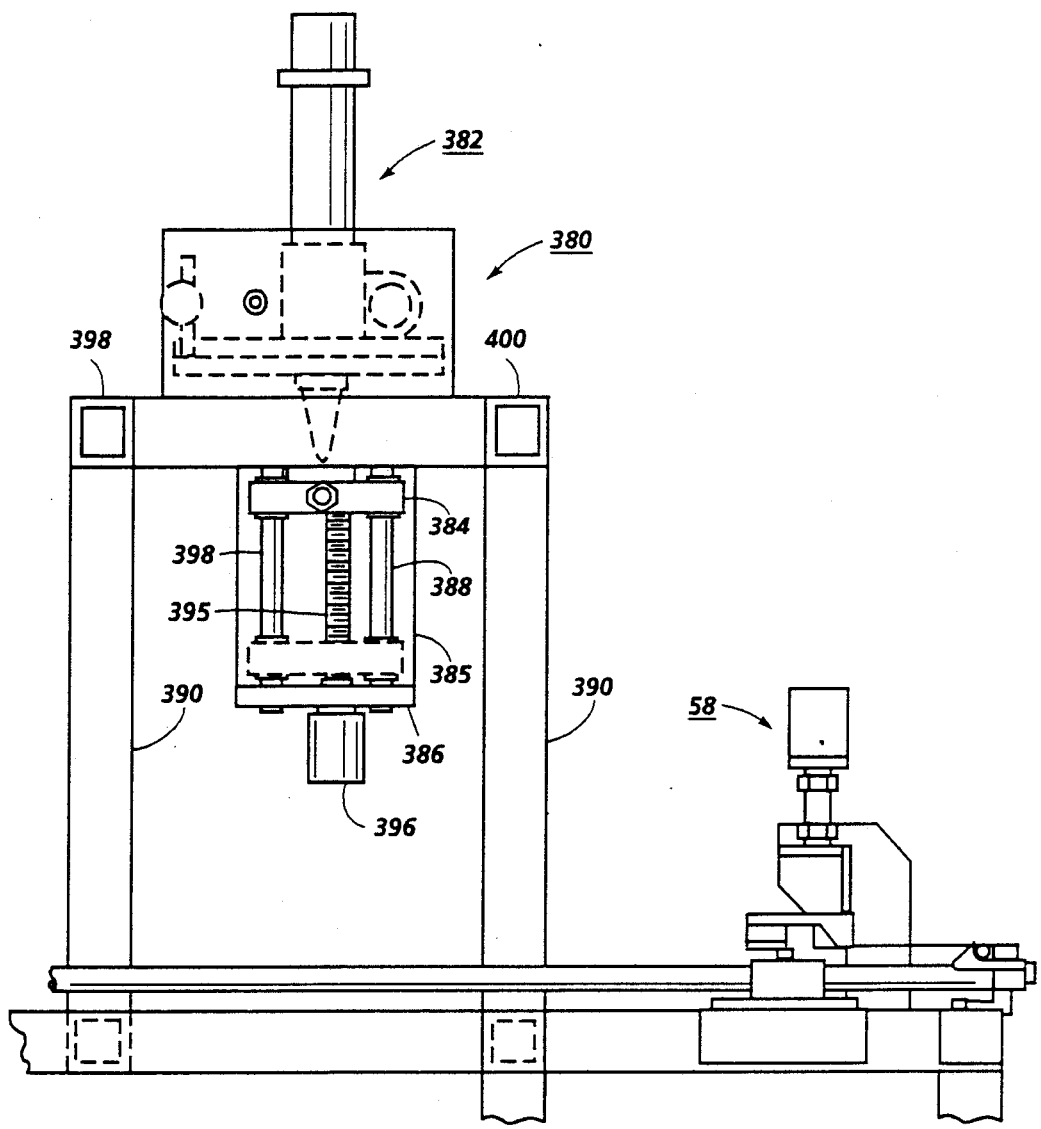
FIG. 15 is a schematic, sectional view in elevation of another embodiment of a web loop forming apparatus.
Figure 16:
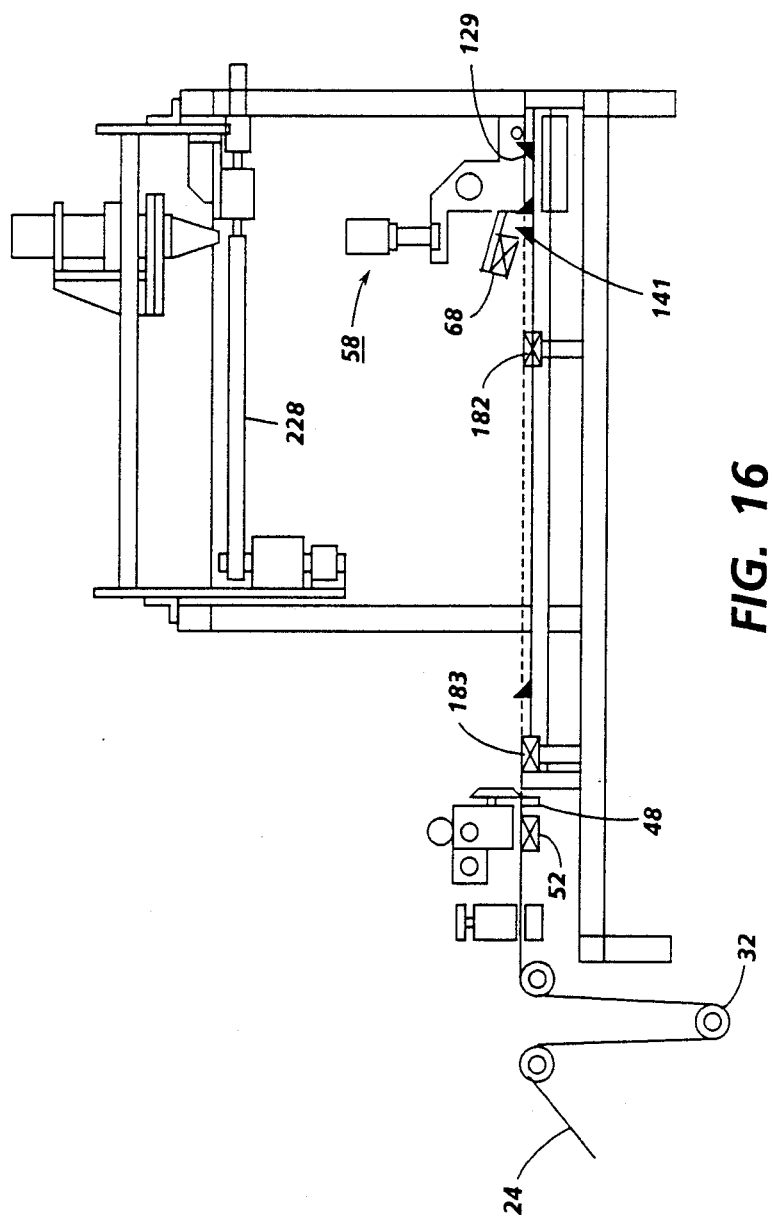
FIGS. 16 through 23 are simplified schematic, sectional views of a belt loop fabrication system during different stages of the belt loop forming operation.

Referring to FIG. 15, another embodiment of this invention is illustrated in which a welding station 380, unlike welding station 297 (shown in FIGS. 3 and 4), is arranged so that ultrasonic horn and transducer assembly 382 reciprocate along a path that is perpendicular instead of parallel to the path followed by the reciprocatable web pick-up assembly 58. Most of the welding components of welding station 380 are identical to the corresponding components in welding station 297, e.g. identical to ultrasonic horn with transducer assembly 300, solenoid 301, upper hinged half 311, horizontally reciprocateable carriage 313, pillow block 314, pillow block 316, horizontal bar 318, horizontal bar 320, and rotatable lead screw 322. The principal difference, other than overall relative position with respect to path followed by reciprocatable web pick-up assembly 58, is that anvil 384 is moved in a vertical plane and does not move through an arc. The welding (home) position for anvil 384 is at the elevated position shown in FIG. 15 and the lowered, (belt loading), position is depicted by phantom lines 385. The elevated (home) position prevents anvil 384 from interfering with other belt forming operations carried out by the operator prior to loading a belt segment onto anvil 384. The transport assembly for moving anvil 384 in a vertical plane comprises a horizontal support plate 386 welded to the lower end of a vertical plate 388 to form an "L" shaped structure. The upper end of vertical plate 388 is welded or bolted to vertical stand 390. The ends of pair of vertical support rods 392 and 394 are secured to horizontal support plate 386 and the other ends are secured to a horizontal plate (not shown) that in turn is supported by vertical stand 390. A rotatable lead screw 395 drives vertically reciprocateable anvil 384 through a ball nut (not shown) secured to one end of anvil 384. Rotation of lead screw 395 is accomplished by reversible pneumatic motor 396 which is also supported by horizontal support plate 386. Reversible pneumatic motor 396 is connected by suitable fittings, hoses and solenoid operated valves to a source of compressed gas (not shown). Any other suitable reciprocating drive means may be substituted for the ball and lead screw magnetic device. Typical reciprocating drive means include magnetic devices, pneumatic pistons, servomotors, and the like. Welding station 380 is supported by box frame members 398 and 400 which are cantilevered from vertical stand 390. Except for the ball screw attached to one end, construction of anvil 384 is essentially identical to that of anvil 228 shown in FIGS. 12 and 13.

In operation, and with reference to the simplified belt forming sequence illustrated in FIGS. 16 through 23, reciprocating web pick-up assembly 58 is initially at a retracted home position (see FIG. 16) and pivotable plate 68 is pivoted up to raise vacuum shoe 82 up and away from the normal path of web 24 (see phantom line). The leading edge of web 24 is flush with cutting edge 48 as a result of shearing during a previous web loop forming cycle. Dancer roll 32 compensates for any tendency of slack to form in web 24 when reciprocating web pick-up assembly 58 is in the retracted position and also assists in maintaining web 24 under tension during the web loop forming operation. When reciprocating web pick-up assembly 58 is in its retracted position, a vacuum is applied at vacuum shoe 52 to retain the leading edge of web 24 against web receiving platform 50 (see FIGS. 4 and 5). Anvil 228 is in its home position. Invertable gripper paddles 182 and 183 are at their home positions with their upwardly facing surfaces positioned at about the same plane as the upwardly facing surface of web receiving platform 50 as shown in FIG. 5.

Figure 17:
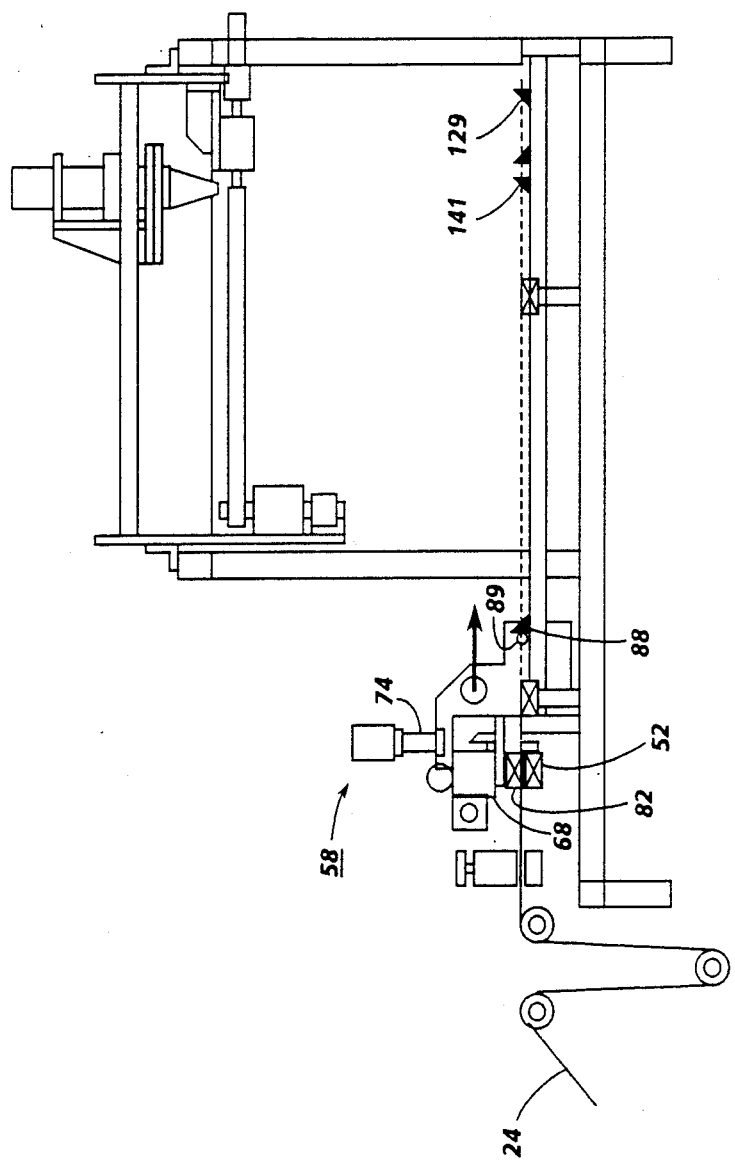
Figure 18:
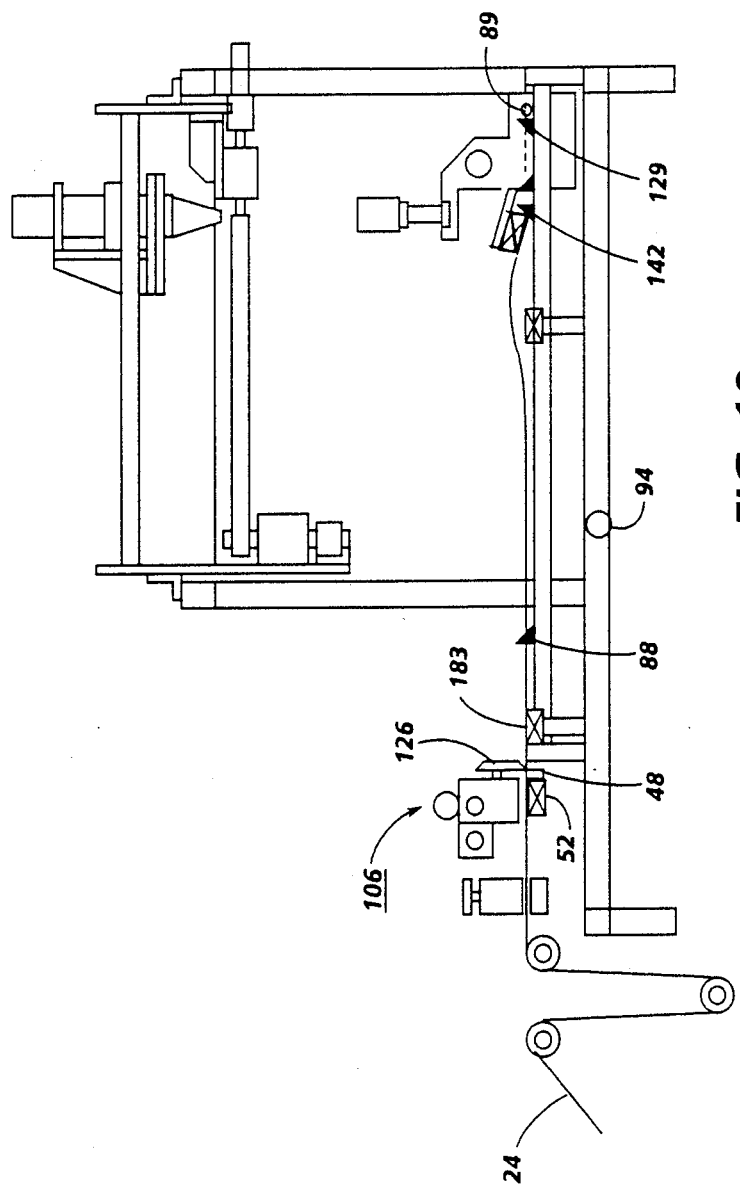

Web pick-up assembly 58 is then advanced by the operator toward the web receiving platform 50 until latch 88 engages pin 89 (see FIG. 17). Latch 129 and latching finger 141 are sequentially depressed by the operator during advancement of web pick-up assembly 58. The operator then presses a palm swith 94 to initiate the following sequence of events controlled by programmable controller 56. Pivotable plate 68 is pivoted downwardly by activation of solenoid or pneumatic cylinder 74 to lower vacuum shoe 82 against the upper surface of web 24. Vacuum is supplied to vacuum shoe 82 (shaded in FIG. 17) and the previously supplied vacuum to vacuum shoe 52 is terminated (unshaded in FIG. 17).

Pivotable plate 68 is then pivoted upwardly by inactivation of solenoid or pneumatic cylinder 74 to raise vacuum shoe 82 and lift the leading edge of web 24 from web receiving platform 50. While sequentially depressing latch 88 and latching finger 142, the operator manually advances reciprocating web pick-up assembly 58 to the cutting position (see FIG. 18) until pin 89 engages latch 129 (see FIG. 4). This pulls the desired length of web 24 past cutting edge 48 located on the downstream edge of web receiving platform 50. A palm button 94 is pressed by the operator to initiate the following sequence of events controlled by programmable controller 56. Initially, the vacuum remains applied to vacuum shoe 52 (shaded in FIG. 18) to retain web 24 against web receiving platform 50. A vacuum is supplied to invertable gripper paddle 183 (shaded in FIG. 18) to retain web 24 against a vacuum groove in the upper surface of invertable gripper paddle 183. The operator then reciprocates web cutter assembly 106 to drive disc shaped cutting blade 126 from its home position along cutting edge 48 and then back to its home position to shear web 24 and form a web segment.

Figure 19:
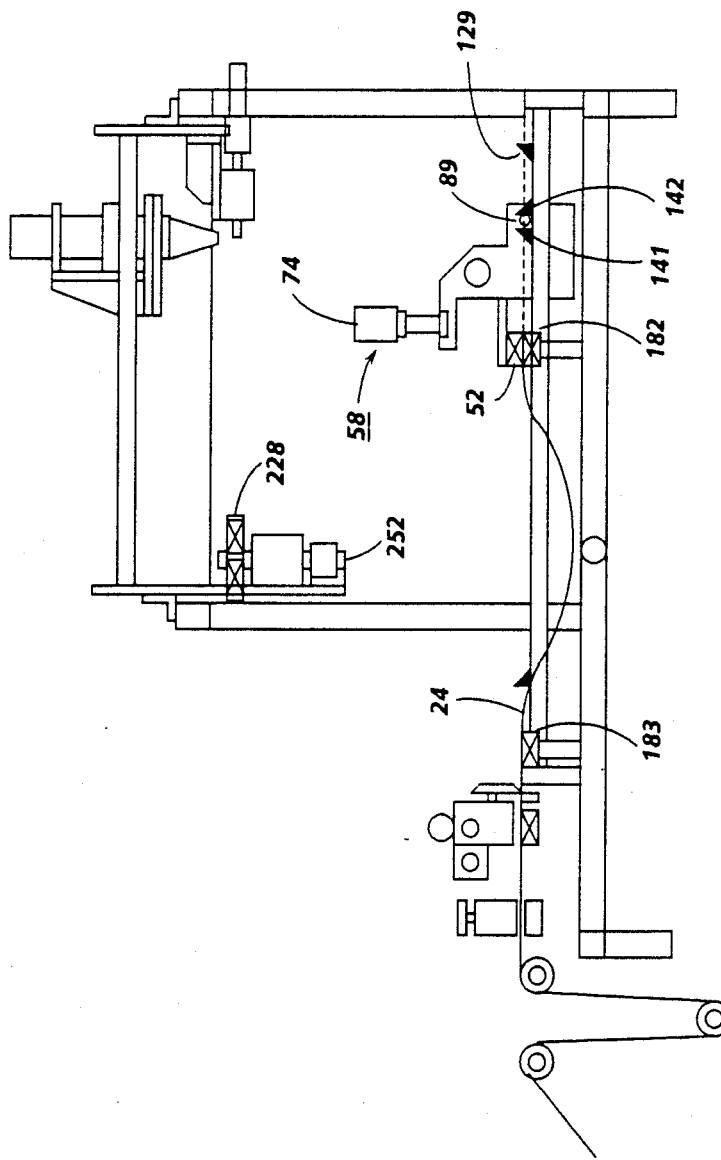

The operator thereafter depresses latch 129 and moves web pick-up assembly 58 to an intermediate position where latching fingers 141 and 142 are engaged by pin 89 (see FIG. 19). This movement causes the portion of the newly formed web segment between vacuum shoe 183 and 182 to form a downwardly hanging loop which greatly facilitates loop formation and prevents buckling of the web segment when the leading edge is subsequently transported to anvil 228. A palm button 94 is pressed by the operator to initiate the following sequence of events controlled by programmable controller 56. Pivotable plate 68 is pivoted downwardly by activation of solenoid or pneumatic cylinder 74 to invertable gripper paddle 182 against the upper surface of web 24, a vacuum is supplied to invertable gripper paddle 182 (shaded in FIG. 19) to retain the leading edge of web 24 against invertable gripper paddle 182, after a brief delay, the vacuum supplied to vacuum shoe 52 is removed (unshaded in FIG. 19), and electric motor or pneumatic cylinder 252 is activated to swing anvil 228 from its home position to a position where its centerline in perpendicular to the path of web pick-up assembly 58. Preferably, anvil 228 is positioned at its home position for clearance reasons during periods when web pick-up assembly 58 is moved from cutting edge 48 to the home position of web pick-up assembly 58 or in the reverse direction. Clearance could optionally be achieved by mounting the anvil at a higher elevation, but such location requires more space and renders it more difficult for an operator to load the invertable gripper paddles 182 and 183 onto the upper surface of anvil 228.

Figure 20:
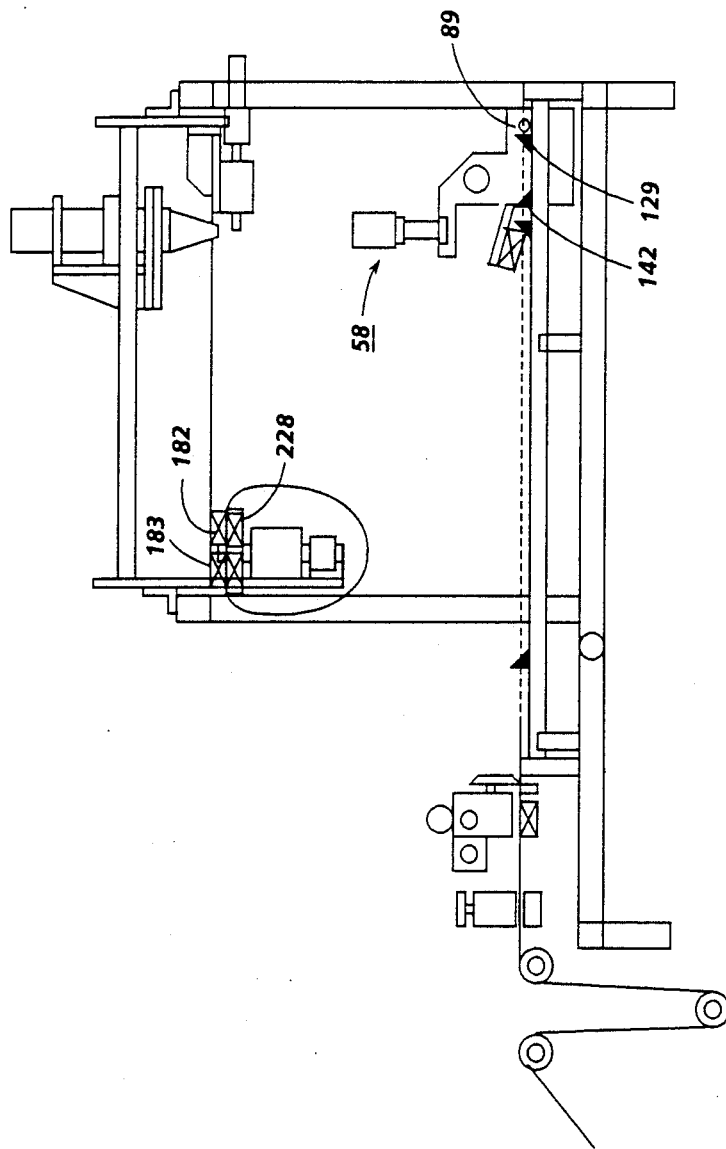
Figure 21:
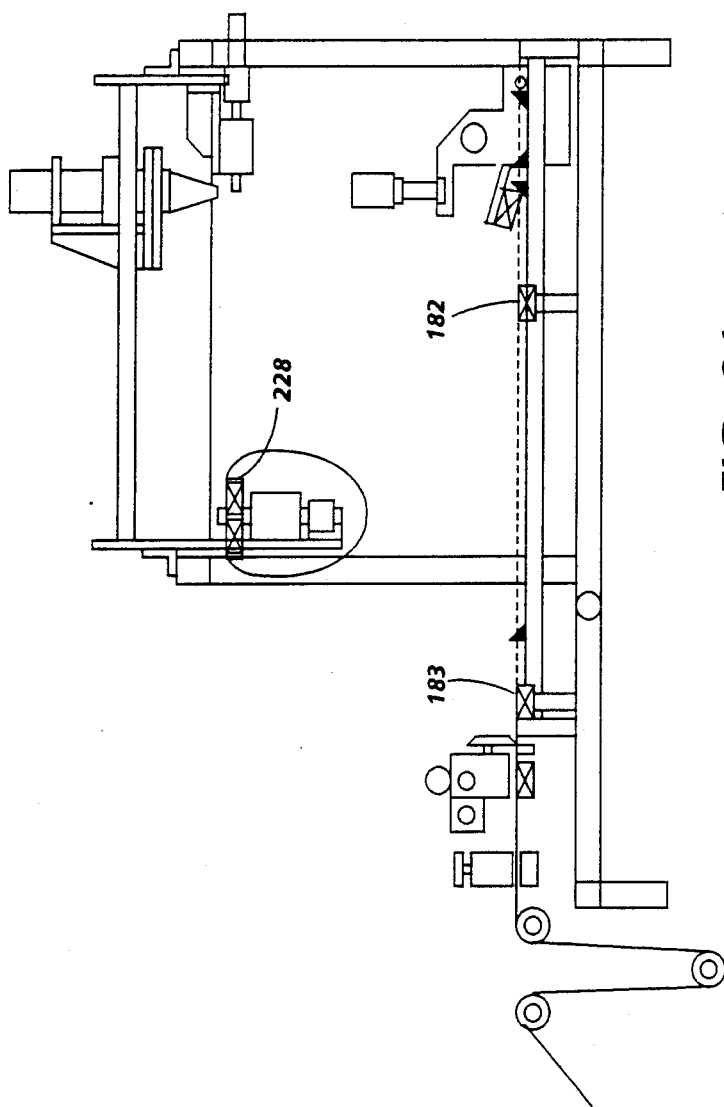

The operator also depresses latching fingers 142 and moves web pick-up assembly 58 to its home position where latch 129 is engaged by pin 89 (see FIG. 20). The operator then raises and inverts invertable gripper paddle 183 and places it in an aligned position on one side of the upper surface of anvil 228 thereby inverting and bringing the trailing edge of the web segment into contact with the upper surface of anvil 228. The operator thereafter raises and inverts invertable gripper paddle 182 and places it in an aligned position on the other side of the upper surface of anvil 228. This inverts the leading edge to form a belt loop having a lap joint in which the leading edge overlaps the trailing edge. The sequence of inverting and placing invertable gripper paddles 182 and 183 may be reversed, depending upon whether the leading edge of the web segment is to overlie or underlie the trailing edge. This is particularly useful for achieving different lap joints from a rolled web having one edge that is different from the opposite edge, e.g. only one edge carries a ground strip.

A palm button same number 94 is pressed by the operator to initiate the following sequence of events controlled by programmable controller 56. Vaccum is supplied to vacuum grooves 264 (FIG. 12) and its twin on the upper surface of anvil 228 (shaded in FIG. 21) which underlie inverted invertable gripper paddles 182 and 183 respectively, and vacuum to inverted invertable gripper paddles 182 and 183 is terminated (unshaded in FIG. 21). The operator inverts and replaces invertable gripper paddles 182 and 183 in an aligned position on their respective pedestals.

A palm button 94 is pressed by the operator to initiate the following sequence of events controlled by programmable controller 56. Electric motor or pneumatic cylinder 252 is activated to swing anvil 228 from a position where its centerline in perpendicular to the path of web pick-up assembly 58 to its home position (see FIG. 22) where the centerline is parallel to the path of web pick-up assembly 58, pressure is supplied to pneumatic cylinder 298 to advance shot pin 296 into shot pin receiving hole 294 (see FIGS. 12 and 13) located at the free end of anvil 228, solenoid 301 is inactivated to extend the ultrasonic horn with transducer assembly 300 toward anvil 228, the ultrasonic horn with transducer assembly 300 is activated, electric motor 332 (see FIG. 4) is activated to drive lead screw 322 which in turn moves horizontally reciprocateable carriage 313 along the lap joint of the web loop carried by anvil 228, solenoid 301 is inactivated to raise the ultrasonic horn from contact with the belt lap joint after carriage 313 completes its traversal of the lap joint, electric motor 332 is reversed to return horizontally reciprocateable carriage 313 to its starting position, pressure supplied to pneumatic cylinder 298 is terminated to retract shot pin 296 from shot pin receiving hole 294, electric motor 252 is activated to swing anvil 228 from a position where its centerline is parallel to the path of web pick-up assembly 58 to a position where the centerline is perpendicular to the path of web pick-up assembly 58 (see FIG. 23), and the vacuum supplied to vacuum grooves 264 and its twin on the upper surface of anvil 228 is removed (unshaded in FIG. 23). Lowering of the transducer in ultrasonic horn with transducer assembly 300 by inactivation of solenoid 301 brings the ultrasonic horn into compressive engagement with the seam of the overlapping ends of web 24.

The welding surface of the ultrasonic horn in ultrasonic horn with transducer assembly 300 may be of any suitable shape such as the flat or curved cross-sectional shapes illustrated, for example, in U.S. Pat. No. 3,459,610 and U.S. Pat. No. 4,532,166, both of which are incorporated herein by reference in their entirety. The high vibration frequency of the ultrasonic horn along its vertical axis causes the temperature of at least the contiguous overlapping surfaces of thermoplastic web 24 to increase until at least the thermoplastic material in web 24 flows. Welding of the contiguous overlapping surfaces of thermoplastic web 24 will also occur if web 24 also comprises thermoplastic material which flows as a result of the applied energy of ultrasonic oscillations. The thermoplastic web 24 may be coated with thermoplastic coatings. The thermoplastic material that is induced to melt and weld the seam may be provided solely by a coating on the web, from both a coating and a web substrate, or solely from the web itself. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web 24 at the lap joint. Any suitable heating technique may be used to provide the heat necessary at the contiguous overlapping surfaces to melt the thermoplastic material and cause it to weld web 24 at the lap joint. Typical heating techniques include ultrasonic welding, radio frequency heating and the like. Ultrasonic welding is preferred because it causes generation of heat at the contiguous overlapping surfaces of the web edges at the lap joint to maximize melting of the thermoplastic material. If desired, the horn may comprise highly thermoconductive material such as aluminum to ensure achievement of higher temperatures at the interface between the overlapping edges of web 24 and to minimize thermal distortion of the exposed surfaces of the web 24. When ultrasonic welding is utilized it is believed that the rapid impaction of one edge of web 24 with the other edge of web 24 at the contiguous overlapping web surfaces between the anvil 228 and ultrasonic horn tip causes generation of heat. A horn vibration frequency of about 16,000 Hz or higher may be utilized to cause the thermoplastic material to soften. A typical horn suitable for joining thin thermoplastic webs utilizes a sonic generator of about 400–800 watt capacity, an operational frequency of about 20 kHz, and a flat input horn welding surface about 12 millimeters long and about 0.04 to 0.1 centimeter wide. A typical motion amplitude for this horn is about 76 micrometers. The combined weight of about 2.5 kilograms for the solenoid 301, ultrasonic horn with transducer assembly 300, and upper hinged half 311 of carriage 313 is sufficient to bring the horn into forced contact with the lap joint. However, air bellows (not shown), a spring bias, weights, counterweights, or other suitable means may be utilized to increase or decrease the contact force. Since heat is generated very rapidly at the interface of the overlapping web ends at the lap joint with this type of device, sufficient heat to cause the thermoplastic materials to melt can occur typically in about 0.2 second as the horn traverses the lap joint.

Figure 22:
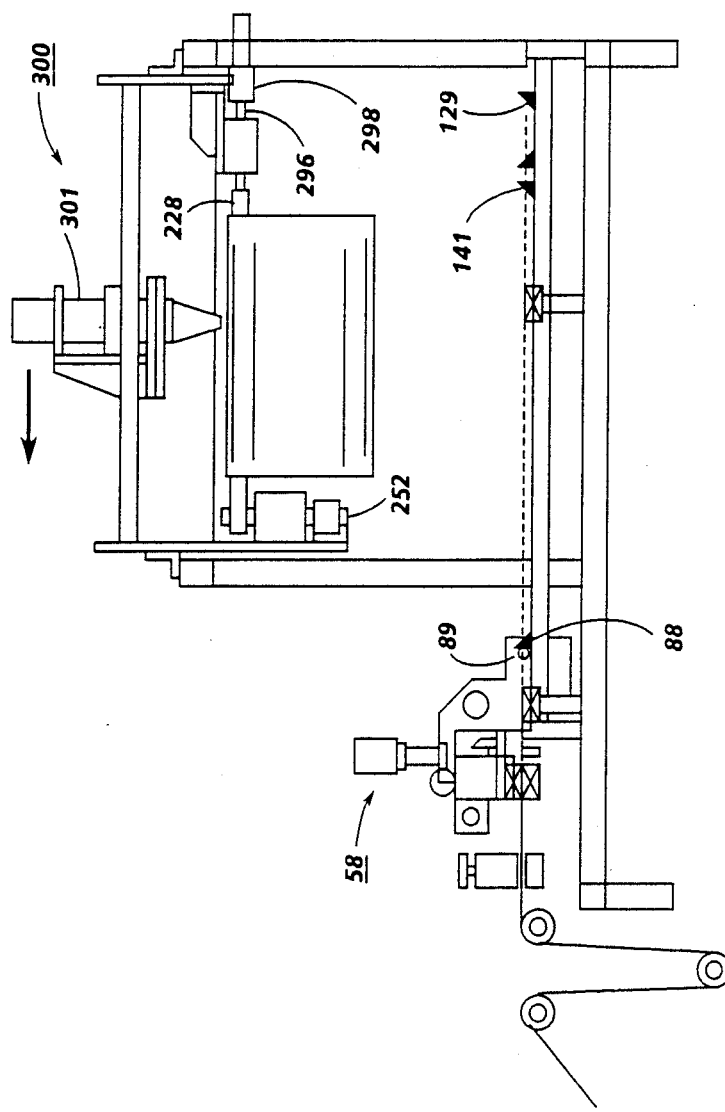
Figure 23:
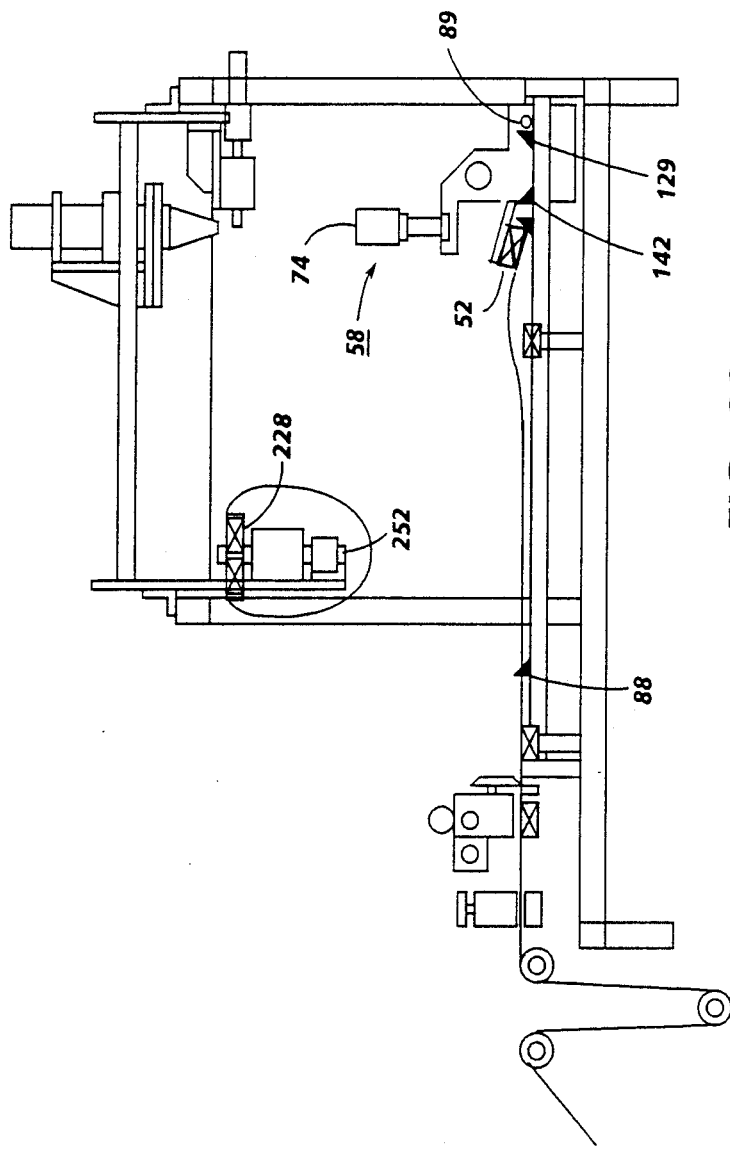

During the welding operation, the operator sequentially depresses latch 129 and latching finger 141 while advancing web pick-up assembly 58 from its home position toward the cutting edge 48 until pin 89 engages latch 88 (see FIG. 22).

The operator then presses a palm switch 94 to initiate the following sequence of events controlled by programmable controller 56. Electric motor or pneumatic cylinder 252 is activated to swing anvil 228 from a position where its centerline in perpendicular to the path of web pick-up assembly 58 to its home position (see FIG. 23), pivotable plate 68 is pivoted downwardly by activation of solenoid or pneumatic cylinder 74 to lower vacuum shoe 82 against the upper surface of web 24, vacuum is supplied to vacuum shoe 82 (shaded in FIG. 23) and the previously supplied vacuum to vacuum shoe 52 is terminated (unshaded in FIG. 23). Termination of the vacuum supplied to vacuum shoe 82 allows transfer of the leading edge of web 24 to vacuum shoe 82. Pivotable plate 68 is then pivoted upwardly by inactivation of solenoid or pneumatic cylinder 74 to raise vacuum shoe 82 and lift the leading edge of web 24 from web receiving platform 50. While sequentially depressing latch 88 and latching finger 142, the operator manually advances reciprocating web pick-up assembly 58 to the cutting position until pin 89 engages latch 129 (see FIG. 4). This pulls the desired length of web 24 past cutting edge 48 located on the downstream edge of web receiving platform 50. This leads into the steps described with reference to FIG. 18 and the belt forming cycle is repeated to form a new belt.

If desired, any flashings on one or both ends of the welded belt lap joint may be removed at a notching station. With reference to FIG. 14, the welded belt is placed on sheet metal table 366 with the welded seam aligned between the pair of dies (only die 356 being shown) located in horizontal flange 354. Alignment may be facilitated by positioning the triangular vertical faces 406 of cantilevered horizontal flange 354 at a predetermined distance from the closest die so that triangular vertical faces 406 function as stops for one edge of the welded web during loading of the web at the notching station. After welded seam is in position notching, the pneumatic cylinders are activated by suitable means such as by depressing a foot operated switch to the drive punch cutters (only pneumatic cylinder 362 is shown) downwardly into the dies located in horizontal flange 354 adjacent to each end of welded lap joint of the belt.

When a belt of a different size is required which has a greater or lesser width and/or diameter than the belts currently in production, nothing need be added or removed from the apparatus of this invention. Different widths may be readily accommodated by merely readjusting the edge guides 44 and 46. If the vacuum shoe on the vacuum pick-up arm is slightly shorter than the width of a new photoreceptor web, the pick-up arm could probably be used either in a modified or unmodified configuration. Modifications that can be made to an original pick-up arm having a vacuum shoe that is too long include applying tape, putty or other suitable material over the portion of the slots in the pick-up arm vacuum shoe that extend beyond the edge of the new web. Belt length and lap joint widths changes can be instantly made merely by changing the location of of the latches and latching fingers.

Any suitable thin, flexible web comprising a thermoplastic layer may be used in the apparatus and process of this invention. The web may comprise a single layer or a plurality of layers in which at least one of the layers comprises thermoplastic material. Any suitable thermoplastic, polymeric material which will melt at the temperatures generated at the contiguous overlapping web surfaces of the seam may be utilized. Typical thermoplastic, polymeric materials include polyethylenes, polypropylenes, polycarbonates, polyvinylacetate, terephthalic acid resins, polyvinylchloride, styrene-butadiene copolymers and the like. The thermoplastic material that is induced to melt and weld the seam may be provided solely by a thermoplastic coating on the web, from both a coating and a web substrate, or solely from the web itself. Thus, for example, a nonthermoplastic web substrate may be coated with a thermoplastic material which is the sole source of the material which melts. Alternatively, for example, the web may be uncoated and consist entirely of the thermoplastic material, some of which melts to weld the seam. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web at the seam. Preferred web thicknesses for use with ultrasonic welding can range from between about 25 micrometers to about 0.5 millimeter. Thicker webs may be utilized as long as sufficient heat is applied to the contiguous overlapping surfaces of the web to cause the thermoplastic material to melt. Webs having a thickness up to about 10 millimeters may be joined with the process and apparatus of this invention.

In a specific example, a web of polyester film (Mylar, available from E. I. duPont de Nemours and Co.) having a width of about 41.4 cm and a thickness of about 76 micrometers and having a first coating on one side of a polyester having a thickness of about 0.2 micrometer and a second coating comprising polyvinyl carbazole about 3 micrometers thick was coated on both sides with a layer comprising polycarbonate resin, each polycarbonate coating having a thickness of about 25 micrometers. This web was processed in an apparatus similar to the apparatus illustrated in the drawings. The leading edge of the web was fed over cylindrical air bearings from a supply roll over a support platform at a belt loop forming station. The end of the web was flush with the far cutting edge of the platform (relative to the location of the supply roll) as a result of shearing during a previous wrapping cycle. The end of the web was held to the far edge of the platform by a vacuum applied to apertures in the platform adjacent the end of the web horizontally reciprocateable vacuum pick-up arm having vacuum apertures was brought into contact with the upper surface of the leading edge of the web. The web was transferred from the platform to the vacuum pick arm by supplying a vacuum to the vacuum pick-up arm and terminating the vacuum applied to apertures in the platform adjacent the end of the web. The web was pulled from the supply roll by an operator who manually advanced the vacuum pick-up arm on a pair of supporting slide bars away from the cutting edge of the platform to the desired belt length of about 20-60 cm from the cutting edge. The belt passed over a pair of invertable gripper paddles having upwardly facing vacuum shoes, each of the paddles being supported on pedestals that aligned the paddles for acceptance of either the leading edge or trailing edge of a segment of the web after the web was cut. One of the paddles was adjacent to the cutting edge and the other was positioned downstream in the direction in which the web was pulled by the vacuum pick-up arm. Vacuum was applied to the apertures in the platform and to the vacuum shoe on the paddle closest to the platform (hereinafter referred to as paddle A). The web was sheared at the cutting edge. The vacuum pick-up arm was then moved by the operator in an upstream direction to the vacuum shoe on the downstream invertable gripper paddles (hereinafter referred to as paddle B) where the leading edge of the web was transferred by supplying vacuum to the vacuum shoe of paddle B and the supply of vacuum to the vacuum pick-up arm was terminated. The vacuum pick-up was pivoted back to its original up position and the vacuum pick-up arm was returned to its home position upstream from the cutting edge. A cantilevered, elongated welding anvil positioned off to ones side of the web with the longitudinal axis of the anvil parallel to the path of the pick arm was pivoted in a horizontal plane at a supported end of the anvil to move the free end of the anvil to a position where the centerline was perpendicular to and overlying the web. The anvil had a width of about 10 cm and a length of about 50 cm. Paddles A and B were then sequentially raised and inverted by an operator to invert their vacuum shoes and web edges against the upper surface of the pivoted anvil and cause the web to droop downwardly to form a loop. A vacuum was applied to a pair of rows of apertures on each side of the centerline of the inserted anvil. The vacuum supplied to the shoes carried by paddles A and B was terminated to effect transfer of the belt loop to the anvil. Paddles A and B were then sequentially returned to their respective pedestals by the operator. The anvil was then pivoted in a direction opposite to the previous direction to return the anvil to the position where the longitudinal axis of the anvil is parallel to the path of the pick arm. The free end of the anvil holding the newly formed belt loop was welded by lowering an ultrasonic welding horn supported in a carriage against the web lap joint and transporting the horn along the length of the lap joint. The horn was biased against the seam due to the controlled weight of about 2.5 kilograms of horn, transducer, bracket and any counterweight pressing against the seam supported by the mandrel. The horn has a flat welding surface about 12 millimeters long and about 0.04 to 0.1 centimeter wide, was operated at a frequency of 20 kHz and a motion amplitude of about 76 micrometers. The horn was transported by the carriage in a substantially horizontal path along the web lap joint at a rate of about 5 centimeters per second. During welding, the horn was allowed to freely move vertically to accommodate variations in the web lap joint thickness. This welding procedure caused the thermoplastic materials in the web to uniformly melt and weld the web seam. Upon completion of the welding of the belt lap joint, the ultrasonic welding horn was raised away from the web lap joint to a retracted position.

While the belt was being welded, the operator repeated the steps for pulling out and cutting a fresh belt segement. After welding was completed, the anvil with the belt welded at the belt welding station was pivoted back in a direction opposite to its previous direction of movement to return the anvil to its previous position where the centerline is perpendicular to and overlying the web, the vacuum supplied to the anvil was terminated and the welded belt was removed from the anvil by the operator.

To prepare a photoreceptor belt having a width of about 30–45 cm and an inside circumference of about 20–60 cm, the same anvil described above having a width of about 10 cm and a length of about 50 cm can be used again with only a minor adjustment to a pick-up arm latch to accommodate the change allowing the vacuum pick-up arm to draw the leading edge of the web past the cutting edge a different distance, e.g. 60 cm instead of 20 cm, and applying tape or other suitable material to the vacuum grooves or other suitable configurations to ensure that the grooves on the vaccum shoes of the anvil, invertable gripper paddles and platform do not extend beyond the edges of the web.

The apparatus and process of this invention shapes, cuts and welds webs into belts in minimal time without duplicate manual handling. The apparatus is simpler, composed of fewer parts and requires less floor space. Further, minimal manual handling decreases the likelihood of damage to sensitive substrates or coatings, particularly for coated substrates that demand precision tolerances such as flexible organic photoreceptors for high speed electrostatographic copiers, duplicators, printers and the like. For example, for photoreceptor belts, even the presence of human fingerprints or scratches will render the belt unsuitable for electrophotgraphic copiers, duplicators and printers. Moreover the apparatus of this invention minimizes the equipment needed for alignment, cutting, welding trimming and other processing of the webs and belts. In addition, the apparatus and process of this invention achieves excellent uniform belt conicity and uniform quality. Also, because of differences in belt size requirements for different electrostatographic copiers, duplicators, printers and the like, the apparatus of this invention can be rapidly and easily converted from fabricating a belt of one diameter or width to preparing a belt of a different diameter or width. Moreover, the characteristics of belt fabrication systems of this invention exhibit are capable of rapidly manufacturing belts of different widths and diameters within precise tolerance standards.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. Apparatus for fabricating belts comprising in combination,
   (a) a web supply means for supplying a web having a leading edge from a web supply roll,
   (b) web cutter means adapted to sever said web in cooperation with a cutting edge to form a web segment having a trailing edge, a midsection and said leading edge,
   (c) an adjustable web pick-up means adapted to temporarily grip the upper surface of said web adjacent to, upstream from and spaced from said leading edge and pull said leading edge to a predetermined position downstream from said cutting edge and thereafter to an intermediate position between said predetermined position and said cutting edge to provide slack in said web,
   (d) a first releasable retaining means to temporarily retain said web pick-up means at said predetermined position downstream from said cutting edge,
   (e) a second releasable retaining means to temporarily retain said web pick-up means at said intermediate position downstream from said cutting edge, (f) a third releasable retaining means to temporarily retain said web pick-up means at a position adjacent to and spaced from said cutting edge, (g) a first invertable gripper paddle means, said first invertable gripper paddle having at least one trailing edge gripper opening, (h) means to form a partial vacuum within said trailing edge gripper opening of said first invertable gripper paddle, (i) means to temporarily align said first invertable gripper paddle adjacent to, downstream from and spaced from said cutting edge with said trailing edge gripper opening facing upwardly to temporarily grip the lower surface of said web adjacent to and spaced from said trailing edge when a partial vacuum is formed within said opening, (j) a second invertable gripper paddle means, said second invertable gripper paddle having at least one leading edge gripper opening, (k) means to form a partial vacuum within said leading edge gripper opening of said second invertable gripper paddle, (l) means to temporarily align said second invertable gripper paddle adjacent said intermediate position downstream from said cutting edge with its leading edge gripper opening facing upwardly, (m) an anvil comprising an elongated arm having a free end, an upper surface, a pivotable end and having at least one leading edge gripper opening and at least one trailing edge gripper opening, said openings extending along the length of said upper surface of said elongated arm and being substantially parallel to each other and spaced from each other by an anvil welding surface, said anvil being pivotable through an arc of about 80° to 100° from an initial position in which the centerline along the length of said anvil is substantially parallel to the path of said web pick-up means, (n) means to support said pivotable end of said anvil, (o) means to align said first invertable gripper paddle with its trailing edge gripper opening facing downwardly on said anvil to temporarily sandwich said trailing edge between said trailing edge gripper opening of said first invertable gripper paddle and said trailing edge gripper opening of said anvil, (p) means to align said second invertable gripper paddle with its leading edge gripper opening facing downwardly on said anvil to temporarily sandwich said leading edge between said leading edge gripper opening of said second invertable gripper paddle and said leading edge gripper opening of said anvil, said means to align said first invertable gripper paddle and said means to align said second invertable gripper paddle being aligned relative to each other whereby said leading edge forms a lap joint adjacent the centerline of said anvil with said trailing edge and said midsection of said web segment forming the bottom of a loop loosely suspended from said lap joint, (q) means to form a partial vacuum within said trailing edge gripper opening of said anvil, (r) means to form a partial vacuum within said leading edge gripper opening of said anvil, and (s) belt welding means adapted to weld said belt at said lap joint while it is supported on said anvil when said centerline of said anvil is positioned substantially parallel to the path of said web pick-up means.

2. Apparatus for fabricating belts comprising, in combination, (a) web supply means for supplying a web having a leading edge from a web supply roll to a belt loop forming station, (b) a web receiving platform, (c) web retention means adapted to temporarily retain said leading edge of said web on said web receiving platform, (d) web pick-up means adapted to temporarily grip said web and pull said leading edge a predetermined distance downstream from said web receiving platform, (e) web cutter means adapted to sever said web to form a web segment having a trailing edge, a midsection and said leading edge, (f) a first invertable gripper paddle means adapted to temporarily grip the lower surface of said trailing edge of said web, (g) means to temporarily align said first invertable gripper paddle adjacent to, downstream from and spaced from said cutting edge, (h) an anvil comprising an elongated arm having a free end, a pivotable end, an upper surface, and having at least one leading edge gripper opening and at least one trailing edge gripper opening, said openings extending along the length of said upper surface of said elongated arm and being substantially parallel to each other and spaced from each other by an anvil welding surface, (i) means to pivot said anvil at said pivotable end to convey said free end through an arc of about 90° from an initial position in which the centerline along the length of said anvil is substantially parallel to the path of said web pick-up means to a position in which said centerline of said anvil is substantially perpendicular to said path and to subsequently pivot said anvil to return said anvil to said initial position, (j) means to form a partial vacuum within said leading edge gripper opening, (k) means to form a partial vacuum within said trailing edge gripper opening (l) means to align said first invertable gripper paddle in an inverted position on said leading edge gripper opening of said anvil whereby said trailing edge of said web segment forms a loop over said midsection of said web segment, (m) a second invertable gripper paddle means spaced downstream from said first invertable gripper paddle means, said second invertable gripper paddle means being adapted to temporarily grip the lower surface of said leading edge of said web, (n) means to align said second invertable gripper paddle at a position downstream from said cutting edge, the downstream distance being less than said predetermined distance downstream from said web receiving platform, (o) means to temporarily retain said web pick-up means adjacent to and above said second invertable gripper means, (p) means to align said second invertable gripper in an inverted position on said trailing edge gripper opening of said anvil whereby said leading edge of said web segment forms a loop over said midsection of said web segment and said leading edge forms a lap joint with said trailing edge and said midsection of said web segment forms the bottom of a loop loosely suspended from said lap joint,
(q) belt welding means adapted to weld said lap joint, and
(r) means to activate said welding means to weld said lap joint while said lap joint is secured to said elongated arm of said anvil to form a welded belt.

3. Apparatus according to claim 2 wherein
(a) said web receiving platform comprises a cutting edge downstream from said web supply roll, said cutting edge being perpendicular to the path of said web;
(b) said web retention means being adapted to temporarily retain said leading edge of said web adjacent said cutting edge;
(c) said cutter means is adapted to sever said web along said cutting edge of said platform to form said web segment having said trailing edge; and
(d) said first invertible gripper paddle means is positioned adjacent to and spaced from said cutting edge of said web receiving platform prior to gripping said lower surface of said downstream edge of said web.

4. Apparatus according to claim 3 including a first releasable retaining means to temporarily retain said web pick-up means at said predetermined position downstream from said cutting edge, said first releasable retaining means being adjustable along the path of said web to retain said web pick means at least one different predetermined distance from said cutting edge for a different run whereby said web pick-up means can pull said leading edge said different predetermined distance to form belts having a different predetermined circumference.

5. Apparatus according to claim 2 including means to remove weld flashings at each end of said lap joint.

6. Apparatus according to claim 2 wherein said web pick-up means adapted to temporarily grip said web and pull said leading edge a predetermined distance downstream from said web receiving platform comprises a reciprocating arm having at least one vacuum port adapted to grip and transport said leading edge to said second invertable gripper paddle.

7. Apparatus according to claim 2 wherein said means adapted to weld said lap joint comprises means adapted to vertically advance an ultrasonic welding horn toward said lap joint from a retracted postition and adapted to substantially horizontally traverse and weld said lap joint with said horn after said horn is vertically advanced toward said lap joint.

8. Apparatus according to claim 2 wherein the sequence of activation of said means to invert said first invertable gripper paddle and said means to invert said second invertable gripper paddle is selectable whereby said leading edge of said web segment is located at the top or the bottom of said lap joint.

9. Apparatus according to claim 2 wherein said means to align said invertable grippers in an inverted position on said trailing edge gripper opening of said anvil comprise a plurality of male alignment members on said invertable grippers and a plurality of female alignment members on said anvil adapted to receive said male alignment member.

10. Apparatus according to claim 2 wherein said means to align said invertable grippers in an inverted position on said trailing edge gripper opening of said anvil comprise a plurality of male alignment members on said anvil and a plurality of female alignment members on said invertable grippers adapted to receive said male alignment member.

11. A process for fabricating belts comprising providing a web from a supply roll, said web having a leading edge adjacent a cutting edge, gripping the upper surface of said web adjacent said leading edge, conveying said leading edge in a straight path a predetermined first distance from said cutting edge while maintaining said web under tension, gripping the lower surface of said web adjacent to and upstream from said cutting edge, gripping the lower surface of said web adjacent to, downstream from and spaced from said cutting edge, cutting said web at said cutting edge to from a web segment having said leading edge at one end and a trailing edge at the opposite end, conveying said leading edge a predetermined second distance in an upstream direction to form slack in said web, gripping the lower surface of said web adjacent to and spaced from said leading edge, gripping the lower surface of said web adjacent to and spaced from said trailing edge, inverting said lower surface of said web adjacent said leading edge, inverting said lower surface of said web adjacent said trailing edge, overlapping said leading edge and said trailing edge on an upper surface of an elongated anvil at a home position, said anvil having a centerline positioned substantially perpendicular to said straight path of said web, to form a loop of said web segment loosely suspended from a lap joint formed by the overlapped leading edge and trailing edge, conveying said loop of said web segment on said anvil along an arcuate path to position said joint substantially parallel to the direction of said straight path, welding said lap joint on said anvil to form a belt welded at said joint, conveying said loop of said web segment on said anvil in an arcuate path in a direction opposite the previous direction until said centerline of said anvil traverses said straight path of said web, and removing said belt from said anvil.

12. A process according to claim 11 including conveying said loop of said web segment on said anvil in an arcuate path in a direction opposite said previous direction until said centerline of said anvil traverses said straight path of said web at about a 90° angle.

13. A process according to claim 12 including conveying said anvil from an initial position in which the centerline along the length of said anvil is substantially parallel to the path of said web to a web loading position in which said centerline is substantially perpendicular to said straight path of said web.

14. A process according to claim 12 wherein the sequence of said overlapping of said leading edge and said trailing edge on the upper surface of an elongated anvil involves overlapping of said leading edge over said trailing edge.

15. A process according to claim 12 wherein the sequence of said overlapping of said leading edge and said trailing edge on the upper surface of an elongated anvil involves overlapping of said trailing edge over said leading edge.

16. A process according to claim 12 including returning said anvil to said home position after removing said belt from said anvil.

17. A process according to claim 12 including conveying said belt welded at said lap joint to a notching station to remove weld flashings at each end of said lap joint.

18. A process according to claim 12 including conveying a fresh leading edge formed from said cutting in a straight path a predetermined first distance from said cutting edge while substantially simultaneously welding said overlapped leading edge and trailing edge of said web segment.

19. A process according to claim 12 including altering said predetermined distance thereby cutting said web at a different predetermined first distance from said leading edge to form a web segment having a different length between said leading edge and said trailing edge.

20. Apparatus for fabricating belts comprising, in combination,
  (a) web supply means for supplying a web having a leading edge from a web supply roll to a belt loop forming station,
  (b) a web receiving platform,
  (c) web retention means adapted to temporarily retain said leading edge of said web on said web receiving platform,
  (d) web pick-up means adapted to temporarily grip said web and pull said leading edge a predetermined distance downstream from said web receiving platform,
  (e) web cutter means adapted to sever said web to form a web segment having a trailing edge, a midsection and said leading edge,
  (f) a first invertable gripper paddle means adapted to temporarily grip the lower surface of said trailing edge of said web,
  (g) means to temporarily align said first invertable gripper paddle adjacent to, downstream from and spaced from said cutting edge,
  (h) an anvil comprising an elongated arm having a free end, a supported end, an upper surface, at least one leading edge gripper opening and at least one trailing edge gripper opening, said openings extending along the length of said upper surface of said elongated arm and being substantially parallel to each other and spaced from each other by an anvil welding surface,
  (i) means to position the centerline of said anvil at a loading location substantially perpendicular to the path of said web pick-up means,
  (j) means to form a partial vacuum within said leading edge gripper opening,
  (k) means to form a partial vacuum within said trailing edge gripper opening
  (l) means to align said first invertable gripper paddle in an inverted position on said leading edge gripper opening of said anvil whereby said trailing edge of said web segment forms a loop over said midsection of said web segment,
  (m) a second invertable gripper paddle means spaced downstream from said first invertable gripper paddle means, said second invertable gripper paddle means being adapted to temporarily grip the lower surface of said leading edge of said web,
  (n) means to align said second invertable gripper paddle at a position downstream from said cutting edge, the downstream distance being less than said predetermined distance downstream from said web receiving platform,
  (o) means to temporarily retain said web pick-up means adjacent to and above said second invertable gripper means,
  (p) means to align said second invertable gripper paddle in an inverted position on said trailing edge gripper opening of said anvil whereby said leading edge of said web segment forms a loop over said midsection of said web segment and said leading edge forms a lap joint with said trailing edge and said midsection of said web segment forms the bottom of a loop loosely suspended from said lap joint,
  (q) belt welding means adapted to weld said lap joint,
  (r) means at said supported end of said anvil to convey said anvil from said loading location along a path in a single plane in a first direction to said belt welding means at a loading location and to return said anvil to said loading location in a direction that is opposite said first direction, and
  (s) means to activate said welding means to weld said lap joint while said lap joint is secured to said elongated arm of said anvil to form a welded belt.

21. Apparatus according to claim 20 wherein each of said invertable gripper paddles comprise a fixed knob at one end and a rotatable knob at the opposite end.

22. Apparatus according to claim 20 wherein said means at said supported end of said anvil to convey said anvil is adapted to convey said anvil in an arcuate horizontal path.

23. Apparatus according to claim 20 wherein said means at said supported end of said anvil to convey said anvil is adapted to convey said anvil in a vertical path while maintaining said anvil in a horizontal attitude.

* * * * *